United States Patent
Rollefstad et al.

(10) Patent No.: US 9,938,011 B2
(45) Date of Patent: Apr. 10, 2018

(54) UNMANNED AIRCRAFT SYSTEM (UAS) WITH ACTIVE ENERGY HARVESTING AND POWER MANAGEMENT

(71) Applicants: Scott B. Rollefstad, New Albany, IN (US); John P. Waszczak, Tucson, AZ (US)

(72) Inventors: Scott B. Rollefstad, New Albany, IN (US); John P. Waszczak, Tucson, AZ (US)

( * ) Notice: Subject to any disclaimer, the term of this patent is extended or adjusted under 35 U.S.C. 154(b) by 0 days.

(21) Appl. No.: 15/389,975

(22) Filed: Dec. 23, 2016

(65) Prior Publication Data
US 2017/0297707 A1    Oct. 19, 2017

Related U.S. Application Data

(62) Division of application No. 14/040,040, filed on Sep. 27, 2013, now Pat. No. 9,527,588.
(Continued)

(51) Int. Cl.
*B64C 39/00*    (2006.01)
*G05D 1/00*    (2006.01)
(Continued)

(52) U.S. Cl.
CPC ............ *B64C 39/024* (2013.01); *B64D 41/00* (2013.01); *G05D 1/0005* (2013.01);
(Continued)

(58) Field of Classification Search
CPC . B64C 39/02; B64C 39/024; B64C 2201/024; B64C 2201/042; B64D 41/00; Y02T 50/44
(Continued)

(56) References Cited

U.S. PATENT DOCUMENTS

| 6,064,179 | A | 5/2000 | Ito et al. ................. 320/128 |
| 7,266,045 | B2 | 9/2007 | Baxter et al. ............ 367/128 |

(Continued)

FOREIGN PATENT DOCUMENTS

GB    2465648    6/2010    ............ B62J 6/14

OTHER PUBLICATIONS

Notice of Allowance issued in U.S. Appl. No. 14/040,040, dated Sep. 1, 2016 (8 pgs).
(Continued)

*Primary Examiner* — Tan Q Nguyen
(74) *Attorney, Agent, or Firm* — Hayes Soloway P.C.

(57) ABSTRACT

A method of harvesting and managing energy from air currents, by small unmanned aircraft systems (UAS) having a plurality of powered and unpowered rotors, to increase the aircraft's flight time, especially where the mission requires extensive hovering and loitering, is provided. Conventional powered rotors create lift for the aircraft. Unpowered rotors can either be: 1) Free-wheeling rotors which increase the plan form area of aircraft as they rotate, increasing lift, and reducing the power draw on the battery, and/or 2) Rotors connected to micro-generators, which serve as a brake on the unpowered rotors, create electrical power to charge the aircraft batteries or directly power the aircraft's electronics. The invention's folding rotor arm design results in a compact package that is easily transported by a single user (man portable). The aircraft can be removed from its protective tube, unfolded and launched for flight in less than a minute. Extended flight times, compact easily transported design, and ability to host flight software on a user's tablet/PC result in low total cost of ownership.

9 Claims, 17 Drawing Sheets

Related U.S. Application Data

(60) Provisional application No. 61/707,468, filed on Sep. 28, 2012.

(51) Int. Cl.
  *B64C 39/02* (2006.01)
  *B64D 41/00* (2006.01)

(52) U.S. Cl.
  CPC .. *B64C 2201/024* (2013.01); *B64C 2201/042* (2013.01); *B64C 2201/066* (2013.01); *B64C 2201/108* (2013.01); *B64C 2201/145* (2013.01); *B64C 2201/146* (2013.01); *Y02T 50/44* (2013.01); *Y02T 50/53* (2013.01)

(58) Field of Classification Search
  USPC .......................................................... 701/3
  See application file for complete search history.

(56) References Cited

U.S. PATENT DOCUMENTS

| | | | |
|---|---|---|---|
| 7,474,589 B2 | 1/2009 | Showen et al. | 367/127 |
| 7,545,121 B2 | 6/2009 | Bolduc | 320/163 |
| 7,796,470 B1 | 9/2010 | Lauder et al. | 367/127 |
| 9,218,316 B2 | 12/2015 | Bernstein | |
| 9,221,537 B2 | 12/2015 | Wang | |
| 2002/0030494 A1 | 3/2002 | Araki et al. | 324/427 |
| 2002/0163251 A1 | 11/2002 | Crombez | 303/152 |
| 2008/0086247 A1 | 4/2008 | Gu et al. | 701/36 |
| 2010/0032947 A1 | 2/2010 | Bevirt | 290/44 |
| 2010/0283253 A1 | 11/2010 | Bevirt | 290/55 |
| 2010/0308174 A1 | 12/2010 | Calverley | 244/155 A |
| 2012/0083945 A1 | 4/2012 | Oakley et al. | 701/2 |
| 2013/0264412 A1* | 10/2013 | Dyrla | B64C 27/82 244/17.13 |
| 2014/0263823 A1 | 9/2014 | Wang | 244/17.23 |
| 2015/0008678 A1 | 1/2015 | Goldstein | 290/55 |
| 2015/0232181 A1 | 8/2015 | Oakley | 701/2 |
| 2015/0259066 A1 | 9/2015 | Johannesson | 244/17.27 |
| 2016/0001883 A1 | 1/2016 | Sanz | 244/17.23 |
| 2017/0066539 A1* | 3/2017 | van der Westhuizen | B64D 27/24 |

OTHER PUBLICATIONS

Office Action issued in U.S. Appl. No. 14/040,040, dated Feb. 1, 2016 (11 pgs).

Product description for "Arducopter 3DR-B," downloaded from Udrones.com (store.3drobotics.com) website on Sep. 27, 2013 (3 pgs).

* cited by examiner

Added total flight time from energy harvesting during hover =
T (P+FW @ 30mph) − T (AP @ 30mph)

UNMANNED AIRCRAFT SYSTEM (UAS) WITH ACTIVE ENERGY HARVESTING AND POWER MANAGEMENT

CROSS REFERENCE TO RELATED APPLICATIONS

This application is a divisional of U.S. patent application Ser. No. 14/040,040, filed Sep. 27, 2013, which in turn claims priority from U.S. Provisional Application Ser. No. 61/707,468, filed Sep. 28, 2012, the contents of which are incorporated herein by reference.

BACKGROUND

1. Field of the Invention

The embodiments of the invention are directed to improvements in the design and operational efficiency of multi-rotor unmanned aircraft systems (UAS) specifically through the application of energy harvesting and power management strategies.

2. Description of Related Art

Wireless radio-controlled (R/C) model helicopters are well-known precursors to today's more sophisticated multi-rotor aircraft such as the Mikrokopter from Mikrokopter.de, or the ArduCopter 3DR-B from Udrones.com. Today's multi-rotor unmanned aircraft systems (UAS) can be manually operated by the user or flown autonomously (i.e., completely preprogrammed flight) or semi-autonomously, and can be purchased off-the-shelf, with 4, 6 or 8 rotors, GPS based guidance, navigation and control (GNC) systems, an autopilot, communications software, live video links, and joystick or PC-remote control. An example of such a multi-rotor autonomous helicopter is described in US 2012/0083945A1 (Oakley et al.). In effect the Mikrokopter and its generation are sophisticated robots that may be used by emergency responders (e.g., fire, search and rescue), law enforcement, border monitoring for illegal drug trafficking interdiction, farmers and ranchers, remote security duty, pipeline inspection and the list of applications continues. However, all known versions share an Achilles' heel: limited flight time due to finite battery performance. All of the known battery-powered systems in use today are constrained to use whatever battery charge was accumulated on the ground prior to launch because they are all strictly battery-powered. Therefore, methods of lengthening flight time by minimizing power usage or generating energy during flight operations are desirable goals.

SUMMARY OF THE INVENTION

Embodiments of the invention are directed to an aircraft energy harvesting and power management system comprising a battery-powered airframe having a plurality of powered and unpowered rotors; flight electronics systems for providing control and power to the powered rotors to sustain flight operations, the flight electronics systems controlling the unpowered rotors to modify plan surface area as required; and software comprising energy generation and plan surface area optimization functions for minimizing power consumption and/or generating energy from one or more of the unpowered rotors connected to micro-generators while hovering, loitering, and in-flight. The aircraft will have a plurality of rotors that in several embodiments include four, six or eight rotors. The rotors may be arranged in a single plane, or may be arranged in separate planes. The aircraft rotors may have a fixed or variable pitch. The aircraft may additionally comprise articulating knuckles connected to the airframe at one or more rotors so that they rotors may be tilted during flight.

In one embodiment the aircraft's flight electronics systems may include a radio frequency link to a ground station, and an on-board guidance, navigation and control (GNC) system which in one embodiment is a GPS based system. The powered rotors may comprise a rotor connected to a direct current motor in electrical communication with an Electronic Speed Control (ESC). The unpowered rotors may comprise a rotor connected to a micro-generator which is in electrical communication with the flight electronics system, or the unpowered rotors may be simply de-coupled from the motor, or in yet another embodiment they may be simple free-wheeling rotors with no motor or micro-generator present.

In another embodiment the aircraft has an airframe that comprises a chassis with folding arms that pivot and connect to the chassis, an upper dome and a lower dome, landing legs and accessory support plates. The upper dome further comprises aim cutouts that are adapted to accommodate the arms when the arms are in a vertical position, whereby when the arms are lowered to a horizontal position and the upper dome is rotated, the arms are locked into flight position.

Another embodiment includes a kit comprising the aircraft in combination with a protective tube for storing and transporting the aircraft when the arms are folded and the aircraft is not in operation, and further including a ground station. The ground station is typically a desktop or portable personal computer (PC), a hand-held device such as a "smart" phone or tablet-style PC, or other a digital device with wireless communication capability such as Wi-Fi, a 900 MHz-2.4 GHz RF transceiver or similar wireless modality. In said kit configuration the aircraft is easily transported by single user (i.e., man portable). The combination of said energy harvesting and power management system (which significantly extends flight times), with said compact man-portable design, and ability to host flight software on user's existing PC, results in a low total cost of ownership.

Another embodiment of the invention is a battery optimization system for a rotary-wing aircraft comprising a battery-powered airframe having a plurality of powered and unpowered rotors, data and power buses, and sensors comprising a wind speed and wind direction sensor, an altimeter and a magnetometer; an on-board autopilot in electronic communication with the data and power buses through which the autopilot is connected to the sensors, the autopilot also being in electronic communication with the powered and unpowered rotors; one or more batteries in electrical communication with the system; electric motors connected to and for driving each powered rotor, the electric motors being in electrical communication with the system; a micro-generator connected to each unpowered rotor, the micro-generator being in electrical communication with the system; a battery controller for, when in flight, directing power from the micro-generators to either one or more batteries thereby recharging it/them, or to said power bus thereby powering said aircraft electronic systems. Wind speed and direction information may alternatively be determined by the on board computer using navigation system data.

The battery optimization system may further comprise sensors for detecting/determining wind direction and speed such as a magnetometer, a GPS system, barometric pressure sensor, and a 3-axis gyroscope/accelerometer. In one embodiment the electric motor is a direct current brushless motor which is in electrical communication with an ESC.

In another embodiment, the autopilot comprises software that receives data from the wind speed sensors and if the wind speed exceeds a pre-set value, the autopilot pitches the aircraft upwards and into the wind to increase lift, reducing the power draw on the battery. In another embodiment the autopilot allows at least one unpowered rotor connected to a micro-generator to freewheel and subsequently signals the battery controller to direct the electrical current generated to either recharge at least one of the batteries or to power the aircraft electronic systems. In another embodiment the battery controller comprises software that will compare battery charge levels and direct current to the battery with the lowest charge. If the batteries are fully charged then the battery controller will direct current to power the aircraft electronic systems.

Yet a further embodiment of the inventive solution is an autonomous or automated method of operating a multi-rotor aircraft, at least partially powered by battery, comprise an airframe having a plurality of powered and unpowered rotors, data and power buses, and sensors comprising a wind speed and wind direction sensor, an altimeter and a magnetometer; providing an on-board autopilot adapted to be in electronic communication with the airframe through which the autopilot is connected to the sensors, the autopilot being programmed to execute the following actions: flying/loitering/hovering the aircraft by applying power to at least one powered rotor; measuring/determining relative wind speed and wind direction at the aircraft, and determining whether the wind speed is at or greater than a predetermined minimum wind speed; orienting the aircraft substantially into the wind; increasing the relative angle of attack of the aircraft incrementally until a positive rate of climb is detected; decreasing power to the at least one powered rotor until the rate of climb is adjusted to a desired new rate of climb; and repeating the last two steps until no further positive rate of climb is detected, or the stall limit is reached. In another embodiment of the method at least one rotor is unpowered and free-wheeling and is connected to a micro-generator, whereby the unpowered rotor/micro-generator combination rotates due to the air currents and the electrical current generated is directed to a battery controller for either recharging the batteries or powering the aircraft electronic systems. In another embodiment at least one unpowered rotor is adapted to be in electrical communication with the autopilot, the method additionally comprising the step of braking (slowing) the unpowered rotor when the autopilot's software determines a decrease in drag is desired. In another embodiment the aircraft may comprise 4, 6 or 8 rotors. In another embodiment the aircraft comprises eight rotors, four of which are powered and the remainders are either unpowered and free-wheeling, or are each connected to a micro-generator. In a preferred embodiment the aircraft constantly monitors its remaining power on board and compares it to the power required to safely return home and autoland. When operating autonomously the aircraft will automatically return home when the power required to do so approaches the power remaining on board.

DETAILED DESCRIPTION OF PREFERRED EMBODIMENTS OF THE INVENTION

1. Introduction

Figure 1A:
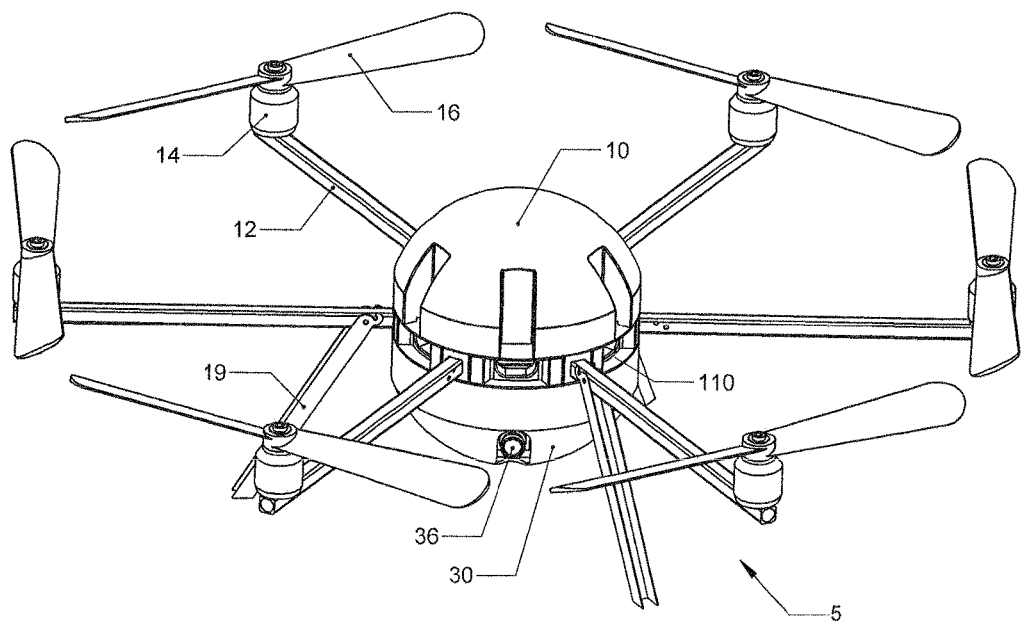
FIG. 1A is an elevational perspective of a computer-generated drawing of a 6-rotor, single plane embodiment of the aircraft.

Embodiments of the inventive concepts disclosed herein include an aircraft energy harvesting and power management system comprising a battery-powered airframe having a plurality of powered and unpowered rotors; flight electronics systems for providing control and power to the powered rotors to sustain flight operations, the flight electronics systems controlling the unpowered rotors to optimize their plan surface area as required to increase lift and reduce the power draw on the battery; power management software to control one or more unpowered rotors connected to micro-generators to generate energy to charge the batteries or power the aircraft electronic systems; said software optimizing plan surface area optimization and energy generation functions for minimizing power consumption and while hovering, loitering, and in flight.

Theory Underlying the Inventions

In a first embodiment of the inventive principles underlying the various inventions herein the unpowered rotors are also referred to herein as "free-wheeling propellers" and are propellers connected to the arms with no connection to micro-generators or motors, and no electronic connection to the autopilot and electronic sensors—they are literally free-wheeling. In this embodiment the aircraft can extend its stationary (aka hovering) flight time by using natural wind, convection currents, and turbulence to harvest energy from these air currents to create lift much like an eagle does in gliding from thermal updraft to updraft, or a sailplane in riding thermals and ridge waves. In one embodiment eight propellers are used on the aircraft: four powered propellers for flying from point to point and stabilizing the aircraft, and four unpowered (free-wheeling) propellers for harvesting the energy from air currents. In one embodiment, the free-wheeling propellers are mounted to a bearing shaft and are free to rotate in any direction. However, in another embodiment a one-way bearing may be mounted to allow rotation in only one direction. The free-wheeling propellers are "along for the ride" when flying to or from a destination and may, or may not function to assist the aircraft.

In a first embodiment of a method of operation, when the aircraft arrives at a destination (also known as a "waypoint" or "point of interest") the autopilot will stabilize the aircraft over the destination. It will next begin a stationary hover over the destination and the free-wheeling propellers will begin to rotate when the relative angle of attack to the wind is increased slightly by tilting the aircraft with respect to the airflow direction (pitch up into the wind). The moving air then flows faster through the free-wheeling propellers (much like blowing air through a pinwheel) causing the propellers to rotate faster. As the free-wheeling propellers rotate faster they increase the perceived plan form area (aka wing area) of the entire aircraft which increases both drag and lift resulting in an increase in altitude. The aircraft now transitions from a traditional powered aircraft to a hybrid powered/unpowered aircraft creating some or all of its own lift from wind (like a kite), depending upon the amount of wind available. It is expected that, at the presumed altitudes the aircraft operates, there will always be some wind/air currents available to generate this added lift. As is apparent from the preceding discussion, by adjusting the angle of attack, both lift and drag forces can be controlled to influence the amount of power required to offset the wind pressure.

All propellers (free-wheeling and powered) in this flight condition contribute to the increase in both drag and lift forces which results in an increase in altitude. To reduce/eliminate the increase in altitude, the power draw from the battery may be reduced, slowing the powered motors, extending flight time. The afore-mentioned process is herein called the "Loiter-Ring™" process due to the arrangement of the free-wheeling propellers in a ring. As the free-wheeling propellers, and the powered propellers, increase in speed, the effective plan form area (from the air current's perspective) grows. To the air currents, the individual rotating propellers present as a round and flat plane whose effective area varies with rotational speed. With the propellers arranged in a circular array at the periphery of the aircraft the air currents interact with the aircraft as if it were one large flat circular plane. Stated another way, as a rotating propeller's speed increases or decreases, so does the amount of drag created by the wind. This is so because the volume that is swept through by the propeller in any given time period is variable with the propeller's rotational speed. An increase in rotor speed makes the "virtual disk" created by the rotating propeller larger and is effectively more solid to the airflow attempting to pass through it. The result is that less air passes through the disk thereby increasing drag. Consequently, a decrease in rotor speed makes the virtual disk created by the rotating propeller less solid to the air passing through it. Therefore more air passing through the virtual disk reduces drag. Thus another embodiment of the invention will utilize the variable drag that can be induced via control of free-wheeling rotors.

To compensate for the resulting increase in altitude, lift may be decreased by reducing power to the powered propellers until ascent stops, thus reducing the power draw from the battery. Slowing the powered propellers also reduces the drag due to the air currents perceived reduction in plan form area. To further reduce drag the aircraft may reduce the angle of attack into the wind if required. The Loiter-Ring™ algorithm programmed into the autopilot will continually make minor adjustments to the aircraft in an effort to minimize the power draw on the battery, finding the perfect and most efficient balance of energy to satisfy the flight equation (lift equals weight, thrust equals drag), while maintaining a stationary position over the point of interest.

The weight of the aircraft plays an important role in this equation. For a small, lightweight UAS very little thrust or power is required to overcome its weight. The free-wheeling propellers can create enough lift given sufficient wind energy (e.g., in the case of ridge "waves") to support the aircraft without assistance from the powered propellers. In one embodiment the powered propellers will act only to stabilize and maintain a balance of flight forces. The aircraft may gently rock back and forth in the wind over a waypoint and exhibit a small synchronous increase/decrease in altitude. In this embodiment, power to the driven propellers will be required only to maintain position and stability in the hovering mode. Ideally the Loiter-Ring™ algorithm will eventually reduce this rocking motion to a stable state and "zero-in" on the perfect balance for maintaining a fixed three-dimensional position in space. Since the powered propellers will not assist in producing lift in this state, with the exception of the increase in plan form area created by their idling rotation, the electrical power drain from the on-board battery will be greatly reduced, possibly to zero, and the flight time will be extended.

In another embodiment a different approach to stability will be achieved by braking or reducing the speed of the unpowered propellers via the Hall-effect controlled by the electronic speed controls (ESC). This type of braking force requires less energy than driving the powered propellers. The relative airflow through the propellers will assist in maintaining the rotational speed. When the brake is released the propellers' rotational speed will naturally increase. Hall-effect braking may be harnessed with either a micro-generator or a brushless motor.

In a second another embodiment of the inventive principles underlying the various inventions herein electric micro-generators 15 are attached to and driven by the free-wheeling propellers. Micro-generators are simple brushed or brushless DC electric motors that, when a wind-driven blade is connected to the micro-generator's rotor, the mechanical force turning the rotor will be translated into electrical energy. All wind-driven turbines are essentially based on the generator principle, for example. This embodiment utilizes micro-generators attached to the free-wheeling propellers to generate electricity which can be fed back to the aircraft to power the electronics. In an alternate embodiment excess electricity generated could be used for charging the battery pack. Stability control is achieved by braking or releasing the micro-generators, thus reducing/increasing the speed of the free-wheeling propellers. This will reduce and possibly eliminate the need for any power being applied to the driven propellers. Since the free-wheeling propellers in this scenario provide the stability control, it may be possible to shut down nearly all power to the driven propellers. This will greatly reduce power consumption and extend flight times dramatically for missions involving extensive hovering and/or loitering requirements.

Figure 1B:
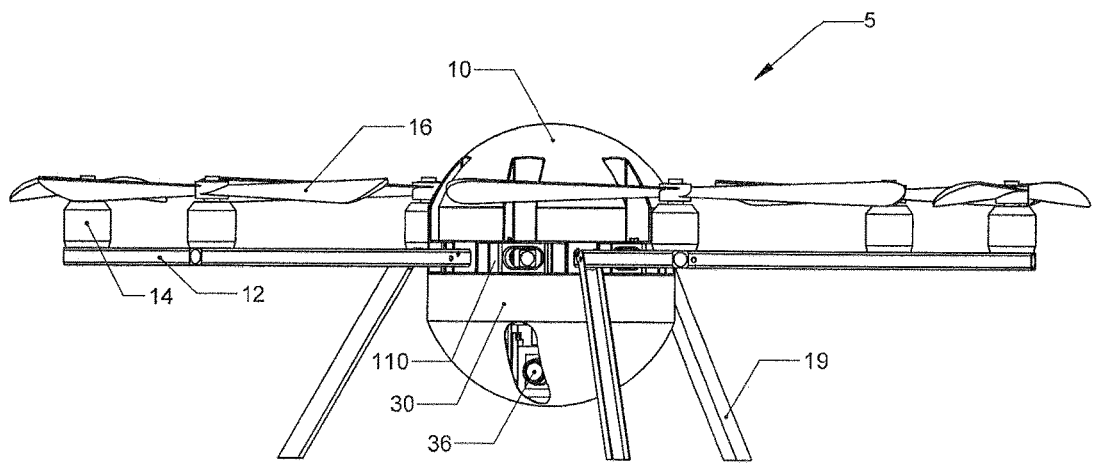
FIG. 1B is a side view of the computer-generated drawing of the 6-rotor embodiment of the aircraft shown in FIG. 1A.
Figure 1C:
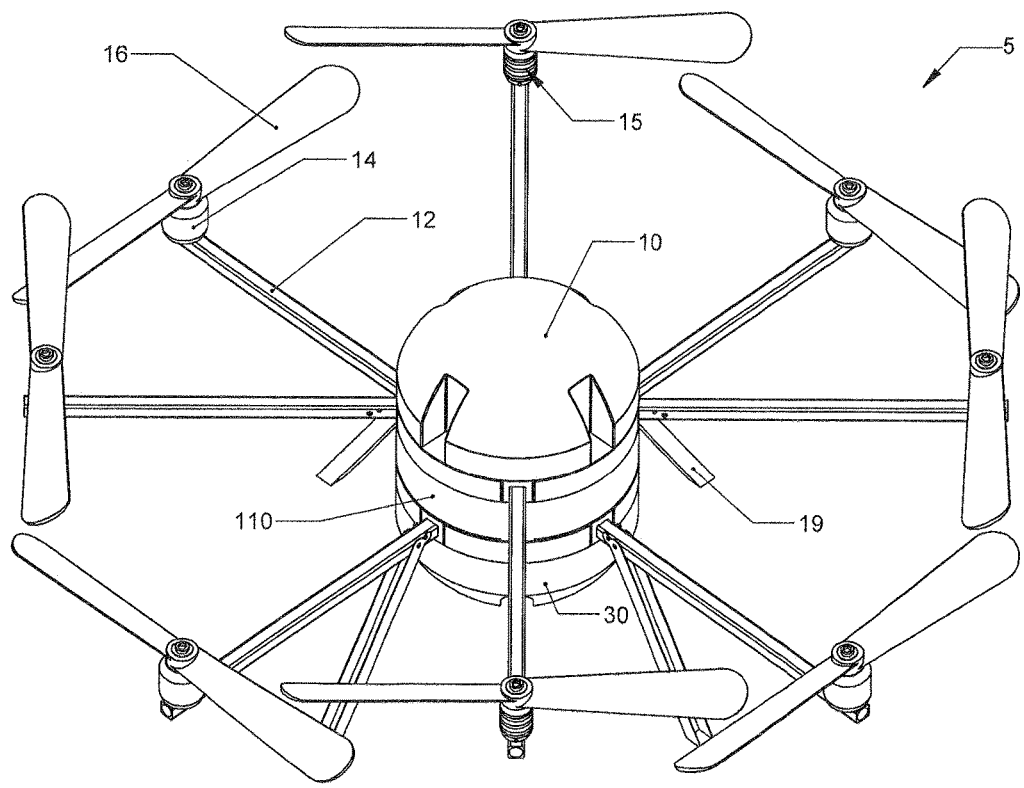
FIG. 1C is an elevational perspective of a computer-generated drawing of an 8-rotor, multi-plane embodiment of the aircraft with one plane (top) dedicated to free-wheeling rotors.
Figure 1D:
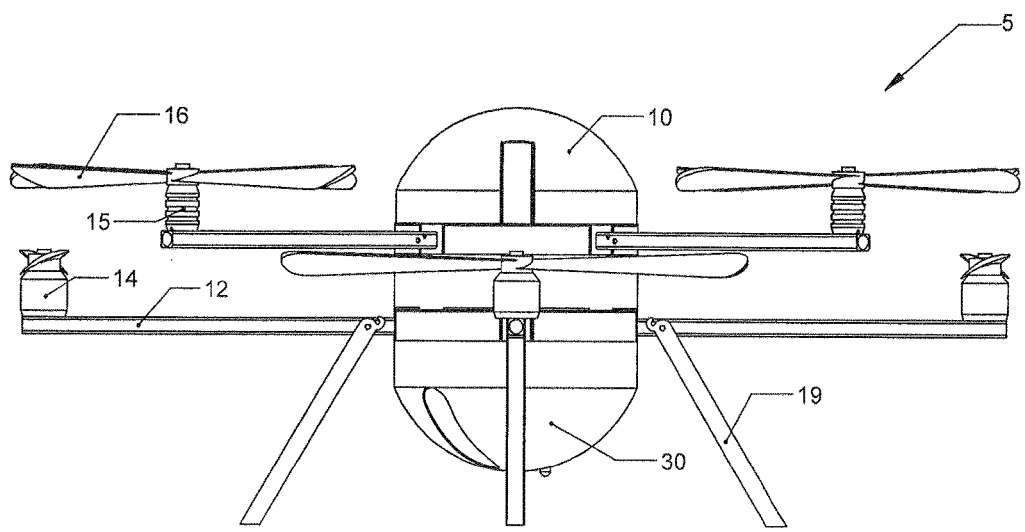
FIG. 1D is a side view of the computer-generated drawing of the 8-rotor, multi-plane embodiment of the aircraft shown in FIG. 1C.

In a third embodiment the rotors may be stacked in layers of two or more parallel or nearly parallel planes. For example, FIG. 1A-1B shows an embodiment of the aircraft with six rotors arranged in a single plane in a spoke-and-hub arrangement. However, FIG. 1C-1D show an eight-rotor embodiment, with four rotors located on a first lower plane and connected to electric motors, and four more "free-wheeling" rotors located on a second parallel plane arranged above the first plane.

2. Defined Terms

The terms "free-wheeling propellers" and "unpowered rotors" are used interchangeably throughout this patent document. The terms "waypoint," "destination" and "point of interest" are also used interchangeably. "Propeller" and "rotor" are also used interchangeably.

Aircraft Energy Harvesting and Power Management System

Embodiments of the invention are directed to an aircraft energy harvesting and power management system comprising a battery-powered airframe having a plurality of powered and unpowered rotors; flight electronics systems for providing control and power to the powered rotors to sustain flight operations, the flight electronics systems controlling the unpowered rotors to modify plan surface area as required; and software comprising plan surface area optimization and energy generation functions for minimizing power consumption and generating energy from one or more of the unpowered rotors while hovering, loitering, and in-flight. The aircraft may have a plurality of rotors that in several embodiments includes four, six or eight rotors. The rotors may be arranged in a single plane, or may he arranged in separate planes. The aircraft rotors may have a variable or fixed pitch. The aircraft may additionally comprise an articulating knuckle connected to the airframe at one or more rotors so that they rotors may be tilted during flight.

In one embodiment the aircraft's flight electronics systems may include a radio frequency (RF) link to a ground station, and an on-board guidance, navigation and control (GNC) system which in one embodiment is a GPS based system. The powered rotors may comprise a rotor connected to a direct current brushed or brushless motor in electrical communication with an ESC. The unpowered rotors may comprise a rotor connected to a micro-generator which is in electrical communication with the flight electronics system, or the unpowered rotors may be simple free-wheeling rotors with no motor or micro-generator present. In yet another embodiment, the rotors are connected to a motor or micro-generator, using one way bearings, enabling them to operate in either a powered or free-wheeling mode.

In another embodiment the aircraft has an airframe that comprises a chassis with folding arms that pivot and connect to the chassis, an upper dome and a lower dome, landing legs and accessory support plates. The upper dome further comprises arm cutouts that are adapted to accommodate the arms when the arms are in a vertical position, whereby when the arms are lowered to a horizontal position and the upper dome is rotated, the arms are locked into flight position. When the upper dome is locked onto the chassis there is a sensor for detecting the presence of the upper dome in a locked position.

In another embodiment the aircraft further comprises a battery optimization system that harvests power from the unpowered rotors to re-charge the battery and/or power other aspects of the airframe, as discussed in more detail below.

Another embodiment is a kit comprising the aircraft in combination with a protective tube for storing and transporting the aircraft when the arms are folded and the aircraft is not in operation, and further including a ground station for communication with and control of the aircraft. The ground station is typically a desktop or portable personal computer (PC), a hand-held device such as a "smart" phone or pad-style PC, or other digital device with wireless communication capability such as Wi-Fi, 900 MHz-2.4 GHz RF transceiver or similar wireless modality. The ground station may be used to communicate a preplanned flight plan to the aircraft when the aircraft is to operate in a fully autonomous mode. The user would plan the flight using the flight software program, then upload the flight plan to the aircraft via a wired or wireless link. Alternately, the aircraft can be used in user-controlled active reconnaissance mode whereby the Ground Station is used to receive and record live video streaming from the aircraft while in flight, the flight being controlled through a wireless, R/C joystick controller. Ground stations and their associated software packages are commercially available.

Battery Optimization System

Another embodiment of the invention is a battery optimization system for an unmanned, rotary-wing aircraft comprising a battery-powered airframe having a plurality of powered and unpowered rotors, data and power buses, and sensors comprising a wind speed and wind direction sensor, an altimeter and a magnetometer; an on-board autopilot in electronic communication with the data and power buses through which the autopilot is connected to the sensors, the autopilot also being in electronic communication with the powered and unpowered rotors; one or more batteries in electrical communication with the system; electric motors connected to and for driving each powered rotor, the electric motors adapted to be in electrical communication with the system; a micro-generator connected to each unpowered rotor, the micro-generator adapted to be in electrical communication with the system; a battery controller for, when in hover, loiter, or in-flight mode directing power from the micro-generators to either one or more batteries thereby recharging it/them, or to the power bus thereby powering the aircraft electronics. This embodiment uses a fixed number of powered rotors attached to a motor or micro-generator, and a fixed number of free-wheeling rotors that will have no motor or micro-generator attached thus saving weight. In this "fixed" configuration the total number of rotors is "X", and the ratio of motorized to free-wheeling rotors may vary from 1:X-1 to X-1:1. For example, if there are six total rotors and three are powered by fixed motors, then the other three are free-wheeling and may have no motor or micro-generator, to save weight. In this latter case the ratio is 3:3.

Another embodiment of the invention is a battery optimization system for a rotary-wing aircraft comprising a battery-powered airframe having a plurality of powered and unpowered rotors, data and power buses, and sensors comprising a wind speed and wind direction sensor, an altimeter and a magnetometer; an on-board autopilot in electronic communication with the data and power buses through which the autopilot is connected to the sensors, the autopilot also being in electronic communication with the powered and unpowered rotors; one or more batteries in electrical communication with the system; a micro-generator connected to each unpowered rotor, the micro-generator being in electrical communication with said system; and a battery controller for, when in hover, loiter, and in-flight mode, directing power from said micro-generators to either one or more batteries thereby recharging it/them, or to said power bus thereby powering said aircraft. This embodiment utilizes a micro-generator for each unpowered rotor, which gives additional flexibility to the aircraft, but added weight. For example, in the six rotor design mentioned above the software may dictate how many and which micro-generators are used to power the rotors (future technology may yield micro-generators that can also serve as efficient motors), and which are used to freewheel and generate electrical power. Environmental conditions may dictate, for example, that an optimal configuration for high, gusty wind conditions is four powered and two unpowered rotors. Or, if conditions are such that light winds predominate then two powered rotors and four unpowered rotors may be optimal. The tradeoff of course is that this design requires the additional weight of the incremental micro-generators over the free-wheeling rotor design having no micro-generators.

Autonomous Method of Operation

Yet a further embodiment of the inventive solution is an autonomous or automated method of operating a multi-rotor aircraft whereby the entire mission from take-off to landing is predetermined and programmed, and uploaded to the onboard flight computer. The aircraft is at least partially powered by battery comprising a battery-powered airframe having a plurality of powered and unpowered rotors, data and power buses, and sensors comprising a wind speed and wind direction sensor, an altimeter and a magnetometer; providing an on-board autopilot adapted to be in electronic communication with the airframe through which the autopilot is connected to the sensors, the autopilot being programmed to execute the following actions: hovering the aircraft by applying power to the at least one powered rotor; measuring relative wind speed and wind direction at the aircraft and determining whether the wind speed is at or greater than a predetermined minimum wind speed; orienting the aircraft substantially into the wind; increasing the relative angle of attack of the aircraft incrementally until a positive rate of climb is detected; decreasing power to the at least one powered rotor until the rate of climb is adjusted to a zero; and repeating the last two steps until no further positive rate of climb is detected, or the stall limit is reached. In another embodiment of the method at least one rotor is unpowered and is connected to a micro-generator, whereby the unpowered rotor/micro-generator, spin due to the air currents and the electrical current generated is directed to a battery controller for either recharging the batteries or powering the aircraft electronics. In another embodiment at least one unpowered rotor connected to a micro-generator is adapted to be in electrical communication with the autopilot, the method additionally comprising the step of braking the unpowered rotor/micro-generator when the autopilot's software determines a decrease in drag is desired. In other embodiments the rotors may comprise 4, 6 or 8 rotors. In an exemplary embodiment the aircraft comprises six rotors, three of which are powered and the remainders are unpowered and free-wheeling, or connected to a micro-generator.

3. Exemplary Embodiments of the Various Inventions

A first embodiment of the invention is depicted in FIG. 1A and 1B. FIG. 1A is an elevational perspective of a computer-generated drawing of a six-rotor embodiment of the inventive principles. Multi-rotor aircraft 5 is shown comprising an upper dome 10, a lower dome 30 and a middle portion comprising a chassis 110 which supports the aircraft avionics above and a battery pack 182 and sensor platform below. The sensor platform may be a camera platform assembly 90, a camera-gripper assembly 34 or other sensor package. Arms 12 when unfolded, as shown, radiate outwardly from the chassis 110. The arms have mounted near or at their periphery an electric motor 14, or alternatively a micro-generator 15, which in turn has a rotor 16 attached to it. The motor-rotor combination provides the thrust to lift and propel the aircraft in a well-known conventional manner. Landing legs 19 are provided at various positions around the aircraft to allow the aircraft to land on the landing legs so that damage to the lower dome 30 and its contents is avoided. The unfolded/operational dimensions of this embodiment are approximately 6-9" in height by 24-36" in width. In a folded configuration the aircraft fits into a tube measuring approx. 6"×18". The weight of the aircraft is approx. 3-6 lbs. with a standard camera and battery pack; with additional accessories it may weigh up to 10 lbs. It may travel at up to 45 mph.

In another embodiment arms 12 may have an articulating knuckle (not shown) attached at or near the distal end that is in turn connected to the motor. This allows the motor's thrust vector to be adjusted during flight which gives the aircraft additional flexibility to maneuver. The articulating knuckle is in electrical communication with autopilot 120. The articulating knuckle may most likely have one or two degrees of freedom. Other embodiments may have micro-generators similarly attached to the arms to control their pitch into the wind independent of the direction into the wind of the motors.

The rotors may have any number of blades but typical is from 2-5. In a further embodiment the rotors may have variable pitch controlled by a "collective" which is a common mechanism for adjusting the pitch of the individual blades of a single multi-bladed rotor. Applied to the free-wheeling propellers, a collective allows the amount of plan surface area and drag to be adjusted. For example, if a free-wheeling propeller's pitch is minimized, plan surface area and drag will increase, while an increase in pitch will decrease both. Algorithms programmed into the autopilot may facilitate plan surface area modification via a collective pitch adjustment mechanism, which is well known in the helicopter mechanical arts.

The aircraft of FIG. 1C-1D is similar to the aircraft of FIG. 1A-1B except that an additional layer of rotors has been added allowing for a total of eight rotors. The layering of the rotors is a different design of the aircraft that allows for flexibility in design. For example, since two or more layers of rotors may be utilized an even further expanded number of rotors may be used. In this embodiment four rotors 16 are driven by electric motors 14, and four more rotors 16 are located in the second layer or plane, where these four added rotors may be free-wheeling or connected to micro-generators 15, the free-wheeling layer of rotors increases the plan surface area of the aircraft. The use of free-wheeling rotors vs micro-generators has the benefit of saving weight.

Figure 2:
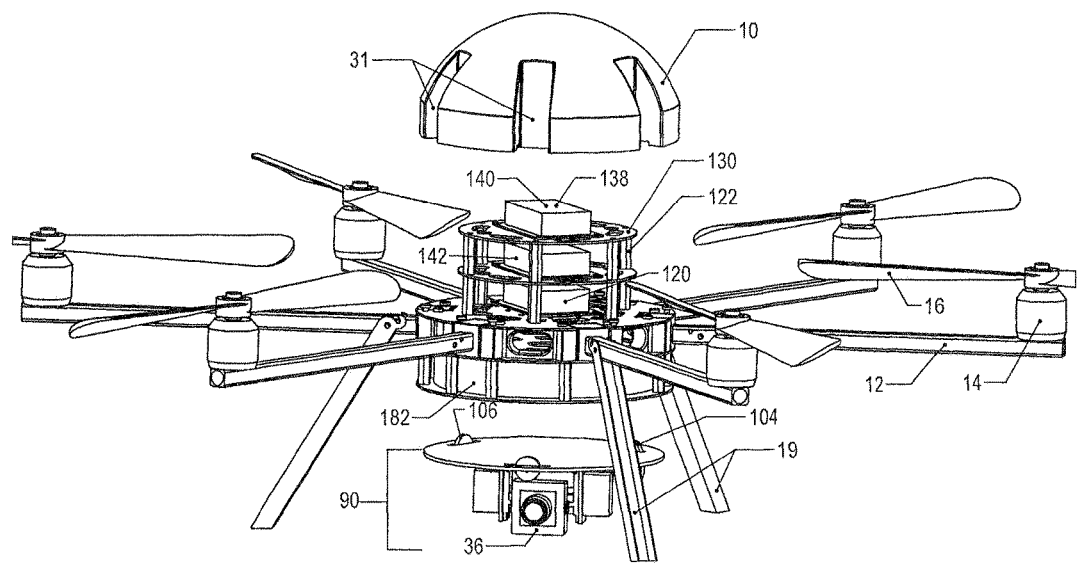
FIG. 2 is an exploded side view of a computer-aided drawing of the aircraft without its lower dome and equipped with its camera assembly 90 and its various components.
Figures 4, 5:
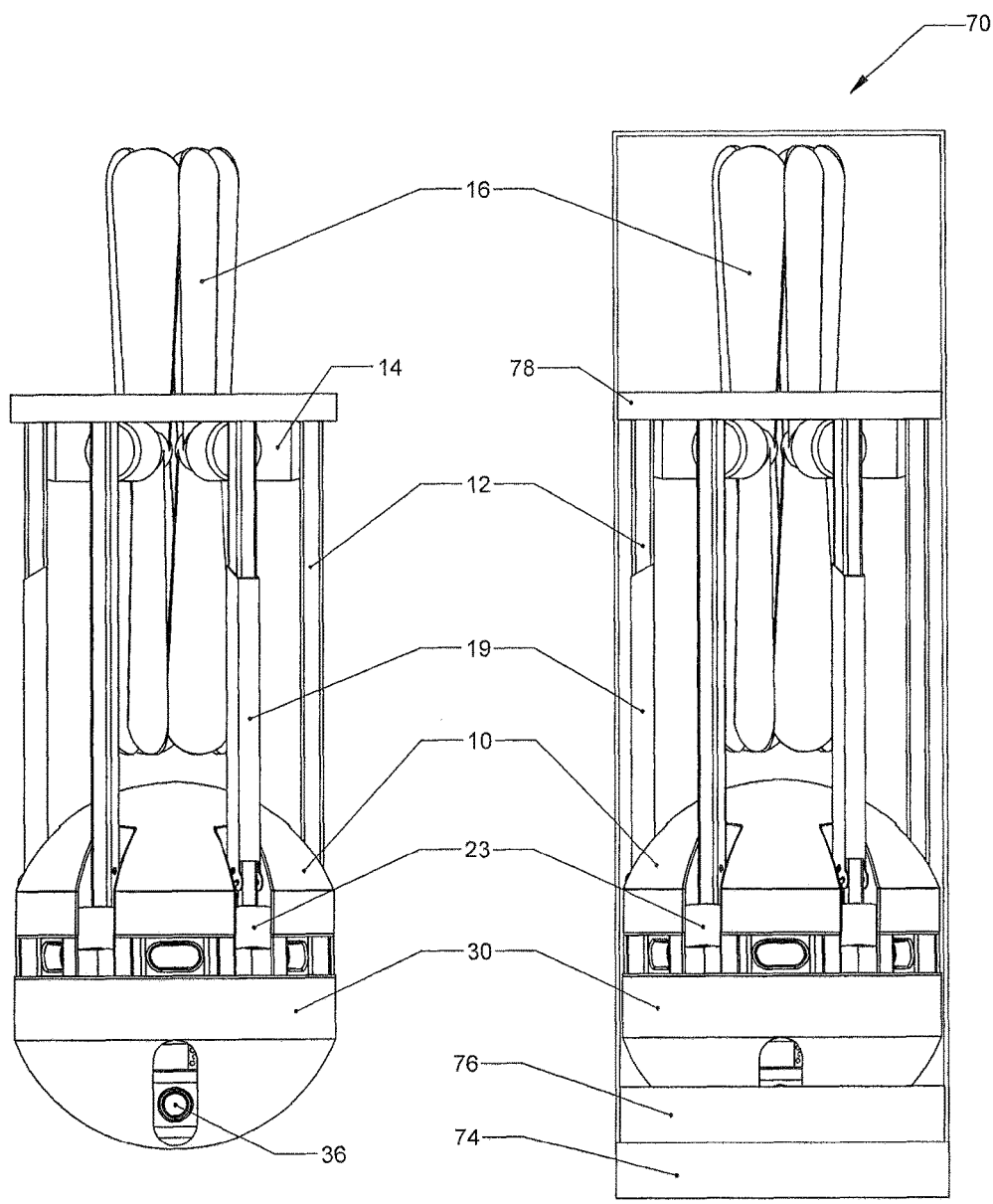
FIG. 4 is a computer-aided drawing of a side view of the aircraft in a folded position.
FIG. 5 is a computer-aided drawing of a side view of the aircraft in a folded position inside the storage tube assembly.

FIG. 2 is an exploded side view of a computer-aided drawing of the 6-rotor aircraft shown in FIG. 1A-1B without its lower dome and equipped with its camera assembly 90 and its various components. Upper dome cutouts 31 are shown. These cutouts are adapted to accommodate the arms 12 in their upright and folded position, as seen in FIG. 4-5. The upper dome 10 is designed with circular detents or holes (not shown) with slots extending therefrom in its base that accommodate the heads of the dome anchors 33 that are mounted on the peripheral rim of the chassis 110. The diameter of the dome anchor head is slightly smaller than the diameter of the hole so that the head may slide up and into upper dome 10. Upper dome 10 is attached to chassis 110 by placement of the dome on the chassis so that the dome anchor heads 33 are aligned with and extend through the holes in the periphery of the dome and up into the dome a short distance. In this position, the upper dome cutouts 31 are aligned with the arms so that the arms may be pivoted upwards and to a final 100 degree or so attitude with respect to horizontal. To lock the arms in horizontal position for flight, the arms are lowered to the horizontal and the upper dome is then twisted so that the cutouts are located about mid-way between each arm. The dome anchor heads 33 will frictionally engage with the slots in the dome periphery in a well-known manner thereby holding the dome securely in position on the chassis. The number of slots and anchors may vary, but a preferred embodiment has one slot/anchor combination for each arm. The chassis comprises a sensor for detecting the presence of the upper dome when in a locked position for safety purposes. The sensor may be any standard sensor such as magnetic proximity detector, an optical sensor, or an inductive sensor. Numerous sensor types are well-known to one of ordinary skill in the art that may be used for this function.

Figure 3:
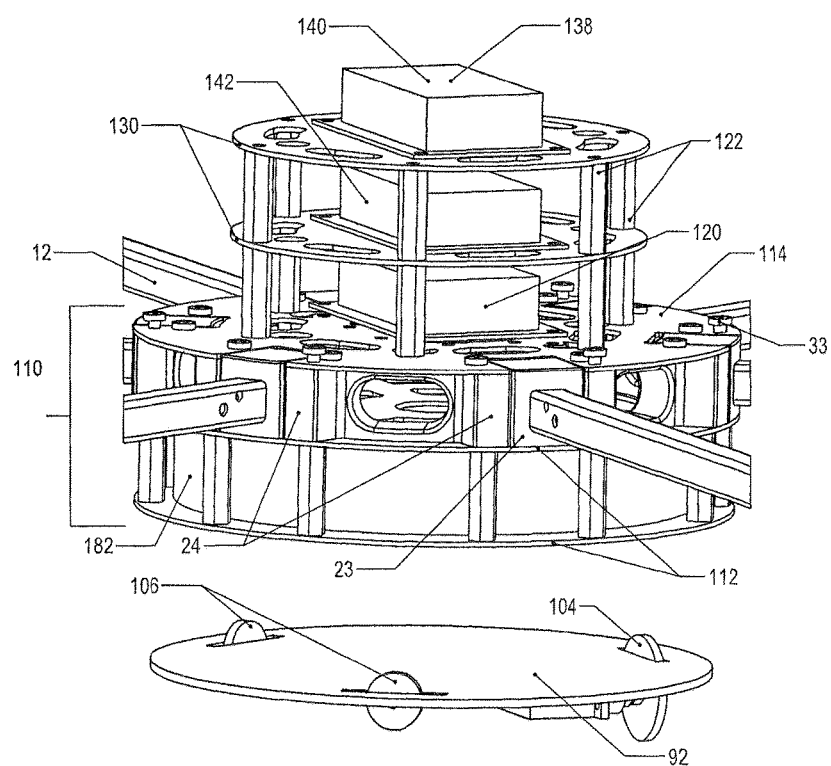
FIG. 3 is a close-up view of the chassis portion of FIG. 2.

FIG. 3 is a close-up, slightly elevated view of the chassis portion of FIG. 2. The chassis 110 comprises lower retainer plates 112, an upper retainer plate 114, pivot assembly 22 (comprising of pivot block 23 and pivot retainer 24), standoffs 122 and various accessory support plates 130. The accessory support plates provide a platform to which various electronic components are located in the instrument and securely affixed for flight. For example, in FIGS. 2 and 3 the autopilot assembly 120 is affixed to the upper retainer plate 114. Accessory support plates 130 retain other electronics such as GPS 138, 3-axis gyro/accelerometer 140, magnetometer 142, pressure transducer 136 (not shown), transponder 146 (not shown) and optical flow detector 144 (not shown). The various Electronic Speed Control (ESC) packages 116 (not shown) are attached to the interior of chassis 110. A dedicated ESC is allocated to each motor and sends the control signals and power to each motor individually at the direction of the autopilot. In an alternate embodiment the ESC may also be attached to the upper retainer or accessory support plates. Each ESC is connected to the autopilot via data bus 170 (not shown) and power bus 160 (not shown). In one embodiment each ESC has a three-wire harness (not shown) that connects it to its dedicated brushless DC motor 14 at the end of each arm 12, the harness most conveniently being run through each hollow arm 12 to the motor 14. A commonly used motor is an ArduCopter model AC2830-358, 850 Kv, from www.diydrones.com.

As best seen in FIG. 3, arms 12 are joined to pivot retainer 24 via pivot block 23 which is formed with an aperture to receive the arm. The pivot block 23 has a hole or other cavity that receives and securely holds the end of the arm 12. In one preferred embodiment the arms are formed of light-weight metal or carbon fiber tubing which is rectangular, square or round in cross-section thereby providing high strength for the high vertical forces experienced by the arms on takeoff and landing. Pivot block 23 is joined to pivot retainer 24 by a block pivot rod 26 (not shown) which extends from the block and fits into depressions on the facing interior surfaces of the pivot retainer 24. This allows the pivot block/arm combination to pivot from a horizontal orientation of the arm to a slightly greater than vertical orientation, as depicted in FIG. 4-5.

FIGS. 4 and 5 depict the aircraft in its folded configuration (FIG. 4) and installed inside the storage tube assembly 70 (FIG. 5). When in the upright position the arms are folded against each other and allow for packaging into storage tube assembly 70. Storage tube assembly 70 comprises a top cap 72 which fits snugly into the storage tube 80 (shown in transparent mode) to hold the aircraft's rotors immobile during transport or storage. The assembly has a bottom cap 74 which also fits snugly into the tube, and has an upper portion is adapted to hold a foam cradle 76 that is designed to receive the lower dome 30 in a shock-absorbing fashion. Motor support ring 78 is an annular ring of plastic foam that is attached to the inner diameter of the tube 80 and serves to abut the motor end of the arms during transport/storage thereby retaining the aircraft securely between the foam cradle 76 and the motor support ring 78.

The caps and tube may be made from conventional ABS plastic, thermoplastic materials or even carbon fiber so long as they are sufficiently rigid to protect the device. Foam cradle 76 and motor support ring 78 are made from softer materials that cushion the device from impacts. One of ordinary skill in the art may select from any number of materials for this purpose, including blown polymeric foams such as polyurethane, polyvinylchloride and polyimide. The dimensions of the packaged aircraft are approximately 6" diameter×18" high.

The aircraft power management system comprises a battery-powered airframe having a plurality of powered and unpowered rotors; flight electronics systems for providing control and power to the powered rotors to sustain flight operations, the flight electronics systems controlling the unpowered rotors to modify plan surface area as required; and software comprising plan surface area optimization and energy generation functions for minimizing power consumption and generating energy from one or more of the unpowered rotors connected to micro-generators while hovering, loitering, and in-flight.

The power for the aircraft is from one or more battery packs 182 that in one embodiment are located below the chassis 110 of the airframe. The battery pack 182 has a standard +/−connection lead that plugs into the airframe via a connector plug. In one embodiment there are four main 3.7 V 6000 mAh Li—Po batteries in the battery pack 182 that connect into the power distribution and voltage regulation bus 160 (not shown) for use by the aircraft's powered rotors, flight electronics, communications and accessories. Four cells wired in series yields a 14.8V battery with 6 Ah capacity. One such battery is the Turnigy Nano-tech 4S Hard Case Li—PO available from the Hobby King Shop at www.hobbyking.com.

Figure 6:
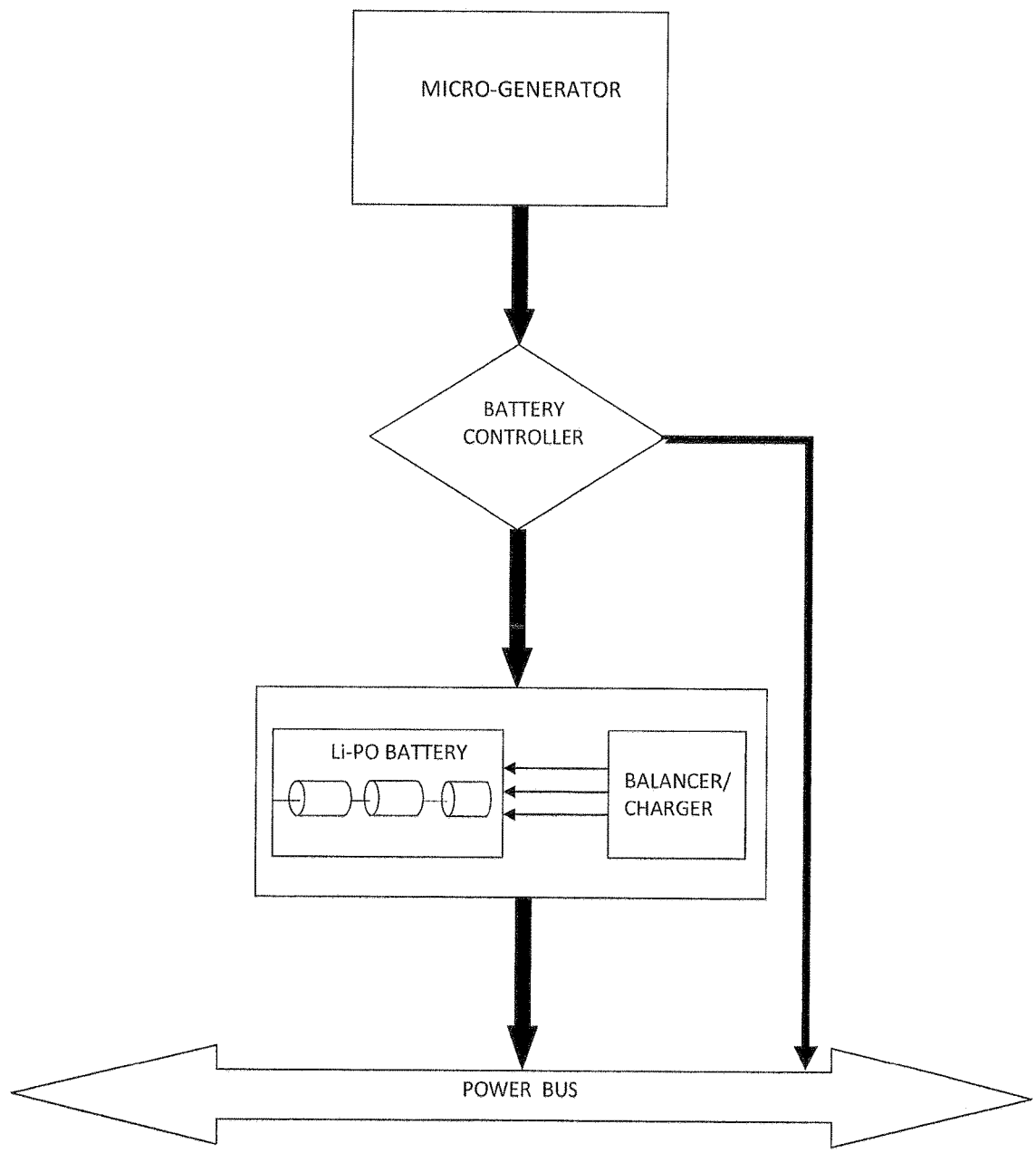
FIG. 6 is a schematic of the battery charging system.

A battery optimization system that allocates power to the power bus, or alternatively harvests power from the unpowered rotors to re-charge the battery and/or power other aspects of the airframe is shown in FIG. 6. While in an energy harvesting mode, a micro-generator 15/rotor 16 combination creates electrical current while free-wheeling, supplying power to the battery controller. The battery controller 185 determines if current should be directed to the power bus 160 or to the battery charging system 180, depending upon the immediate need for power from the aircraft and if it can afford to divert power being generated to recharging activity. If the battery controller determines it can recharge, then it will divert power to battery charging system 180 which comprises Li—Po cells in a pack 182 and an on-board balancer/charger 184, which operates as previously discussed. At any time during re-charge, battery pack 182 may be brought back on-line to discharge according to the determination of the battery controller 185.

The batteries commonly used in today's multi-rotor aircraft include NiMH or Lithium Ion Polymer (Li—Po) batteries, with the latter becoming more prevalent in the multi-rotor aircraft field. Li—Po batteries have certain characteristics that must be taken into account when designing a recharging system. Li—Po battery cells must be charged carefully. They should be charged at constant current until each cell reaches 4.2 V; the charger must then gradually reduce the charge current while holding the cell voltage at 4.2 V until the charge current has dropped to a small percentage of the initial charge rate, at which point the battery is considered 100% charged. Some manufacturers specify 2%, others 3%, but other values are also possible. If the battery cells are arranged in a pack then a balancer/charger 184 should be used to ensure than all cells are charged to a uniform voltage and capacity, otherwise the pack's overall discharge rate is adversely affected by the mismatch. There are two kinds of mismatch in the pack: state of charge (SOC) and capacity/energy (C/E) mismatch. Though the SOC mismatch is more common, each problem limits the pack capacity (mAh) to the capacity of the weakest cell.

Battery pack cells are balanced when all the cells in the battery pack meet two conditions:

If all cells have the same capacity, then they are balanced when they have the same relative state of charge (SOC). In this case, the open circuit voltage (OCV) is a good measure of the SOC. If, in an out-of-balance pack, all cells can be differentially charged to full capacity (balanced), then they will subsequently cycle normally without any additional adjustments.

If the cells have different capacities, they are also considered balanced when the SOC is the same. But, since SOC is a relative measure, the absolute amount of capacity for each cell is different. To keep the cells with different capacities at the same SOC, cell balancing must provide differential amounts of current to cells in the series string during both charge and discharge on every cycle.

Balance charging simply means that the charger monitors the voltage of each cell in a pack and varies the charge on a per-cell basis so that all cells are brought to the same voltage. Battery management systems are described in the following US patent documents which describe and enable battery management methods applicable to Li—Po packs: US2008/0086247 (Gu, Jae-Sung, et al.); US 2002/0030494A1 (Araki et al); U.S. Pat. No. 7,545,121 (Bolduc); and U.S. Pat. No. 6,064,179 (Ito et al.), all of which are incorporated herein by reference. These teachings can be followed by one of ordinary skill in the art to design a fully-functional battery controller. Li—Po battery charger/balancers for charging Radio Controlled (R/C) vehicles are commercially available, and include a Hobby King 2-Cell & 3-Cell Li—Po Battery Balancer/Charger, or an iMAX B6 OEM Battery Balancer/Charger for 1-6 cell Li—Po packs, both available through Amazon.com.

Other battery types include the rechargeable Lithium Sulfur (Li—S) and Lithium Iron (Li—Fe) batteries available from Sion Power, Tucson, Ariz. Li—S batteries may have higher power densities than even Li—Po batteries, making even greater ranges available for UAVs.

The term "battery" can also he taken to mean alternate forms of mobile power sources such as a miniaturized fuel cell, which today generates electrical power via methanol or hydrogen. Although current weight-to-power ratios are not optimal for lightweight UAVs, the technology is advancing and it is foreseeable that such a device will evolve that could power and extend the flight time of the aircraft described herein. The invention described herein will similarly extend the hovering, loitering and flight times of the aircraft powered by advanced power source technology via the said energy harvesting and power management system.

Figure 7:
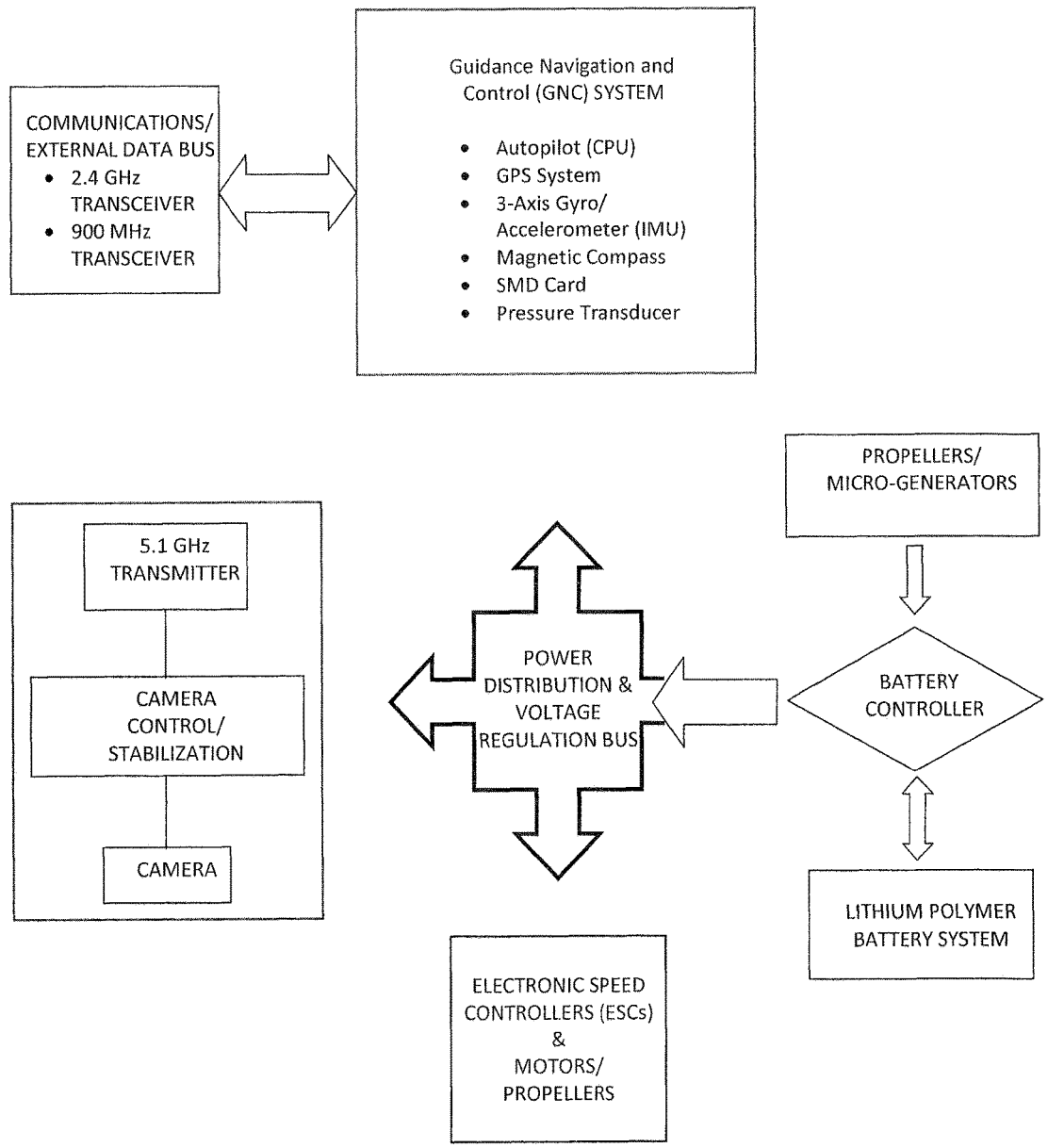
FIG. 7 is an overall operational system depiction of the aircraft's major electronic components and their accompanying power and data connections.

An overall operational system depiction of the aircraft's major electronic components and their accompanying power and data connections is shown in FIG. 7. At the center of the schematic is the power distribution and voltage regulation bus 160, or more simply the power bus. Power bus 160 comprises a board made to accommodate the high power requirements of the motors 14 during takeoff and acceleration generally. It has connections for its main power source, the Li—Po battery system 180 through plug-ins (not shown). On the right side of the schematic power is input to the power bus 160 from the battery controller 185, which determines whether power is from the battery system 180 or the micro-generators 15/rotors 16. Since the voltage from the Li—Po can vary during their discharge cycle, a voltage regulation function is also a part of the board. There are power outputs on the board for the various components shown, including the Guidance Navigation and Control (GNC) system and its plug-ins (the RF communication link 65, the video transmitter 60, etc.), the Electronic Speed Controllers 116 (one per motor/micro-generator), and any of the sensors under the chassis of the unit and housed inside the lower dome 30, including the optional camera-gripper assembly 34. The first component receiving power is the Guidance, Navigation and Control (GNC) System, shown in the top box. It comprises an autopilot assembly 120, an SMD Card 121 (on-board removable memory card for saving flight data, flight mission protocols, etc.), a magnetic compass 142, a 3-axis gyro/accelerometer chip 140, a UPS system 138/139 in most embodiments, and a pressure transducer 136. Also connected to the autopilot is either or both a 900 MHz wireless communications transceiver 200 unit and/or a 2.4 GHz R/C Receiver 210, both for manual flight control. The GNC unit also has an external data bus connection.

Figure 8:
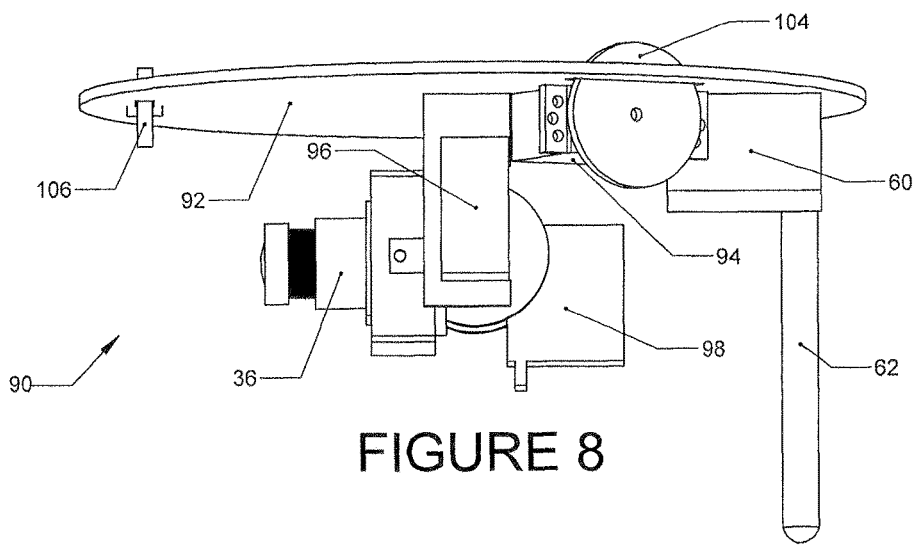
FIG. 8 is a computer-aided drawing side view of the camera platform assembly 90.
Figure 9:
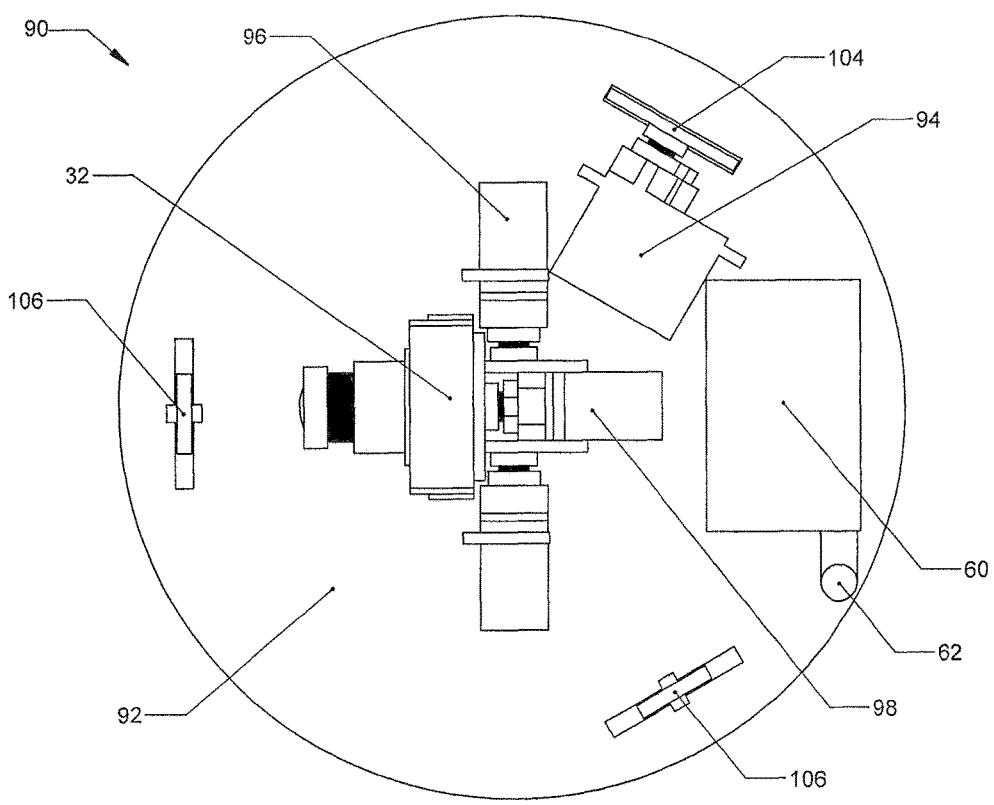
FIG. 9 is a computer-aided drawing of the camera platform assembly 90 from the bottom.
Figure 10:
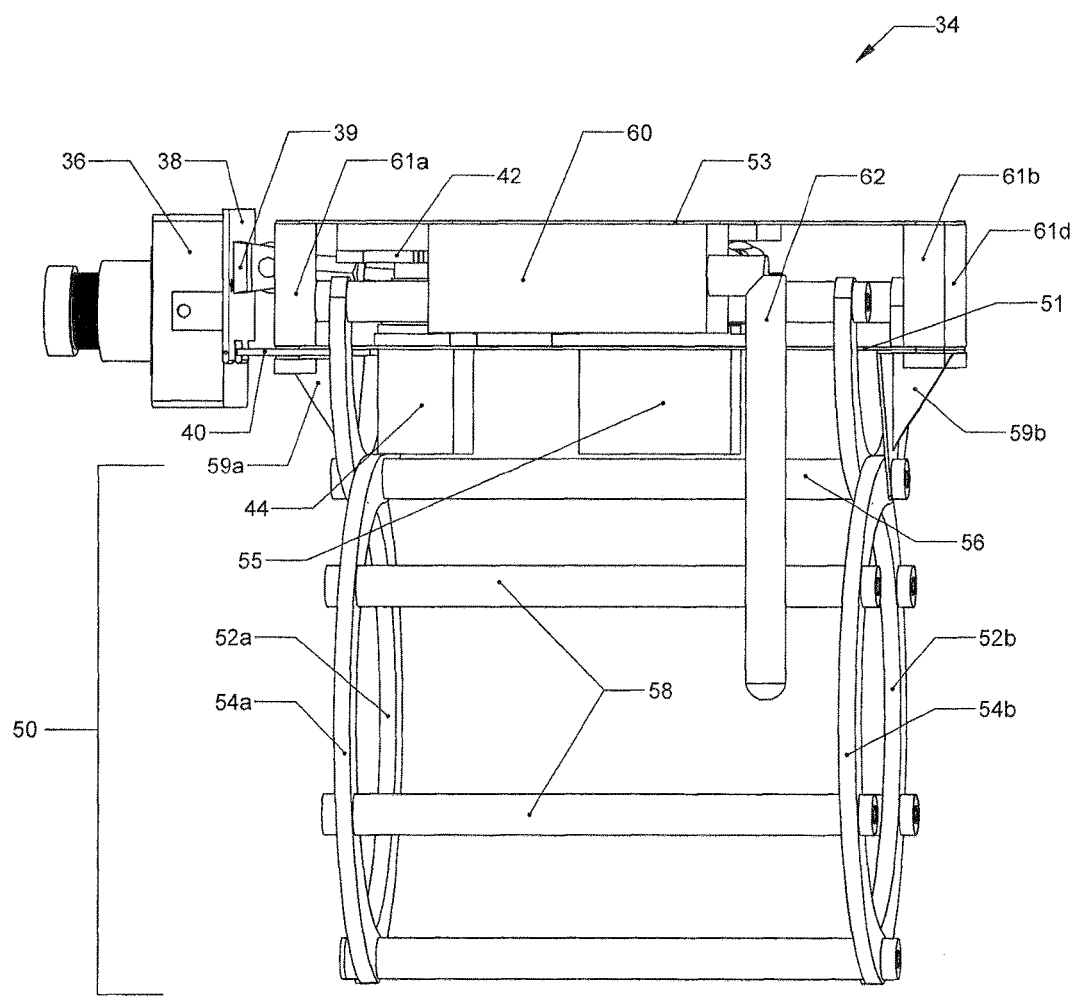
FIG. 10 is a computer-aided depiction of the camera/gripper assembly 34 from the video transmitter 60 side.

In one embodiment power bus 160 directs power to an accessory such as the camera-gripper assembly 34 depicted in FIG. 8-10. Other sensor packages may also be used, but camera-gripper assembly 34 is exemplary. The assembly includes a 5.1 GHz video transmitter 60 for transmitting live video and audio back to the ground station. The camera is controlled and stabilized through a camera stabilization system depicted in FIGS. 8-9 and comprising the three servo motors 94, 96, 98 and linkages previously discussed.

In a separate embodiment power bus 160 directs power to the ESCs and associated micro-generators 15. In this embodiment, the aircraft has only micro-generators at each arm, and the micro-generators have a dual use (this technology is in development) in that a subset of them are used in powered mode to sustain flight and others used in freewheeling mode to generate power.

The flight electronics systems include, in one embodiment, a global positioning system (GPS) receiver device 138/139 which is connected to the autopilot assembly 120. The GPS electronics 138 are connected to the GPS antennae 139 that receives satellite data, which data is sent in real-time to the autopilot 120 and which autopilot 120 uses the data to identify the location of the aircraft 5 in latitude, longitude, and altitude, and determine the aircraft's velocity (speed and direction) in real-time. The UPS system electronics 138 are electrically connected to the data and power buses. The GPS system electronics 138 can be a standard GPS card with antenna 139 which works with all the major navigational systems in use to receive, for example, NAVSTAR or GLONAS systems. One particularly preferred GPS engine is a 66-channel MediaTek MT3329 GPS Engine 10 Hz card, available from it DIYDrones.com.

The autopilot 120 is the central component of the flight electronics system. The airframe houses any off-the-shelf autopilot 120. The autopilot assembly 120 is located on upper retainer plate 114 beneath the upper dome 10 and is connected to the data/power buses. The autopilot 120 is connected to separate Electronic Speed Controllers (ESCs) 116 for each motor 14 and micro-generator 15 of the aircraft 5. Because the autopilot assembly 120 is modular, autopilot assembly 120 can control from 4-12 ESCs 116 and motors 14/micro-generators 15. This arrangement allows the autopilot 120 to direct each of the different motors/micro-generators in order to maneuver the aircraft 5 in any of X, Y or Z directions in the air. The autopilot receives inputs from the GPS, Inertial Measurement Unit (IMU) and a wireless communication transmitter/receiver. An exemplary autopilot is manufactured by Arduino, model ArduPilot Mega 2.5, available from DIYDrones.com.

The autopilot 120 is connected to a 900 MHz wireless communication transmitter/receiver 200, which transmits and receives wireless instructions from a ground station (not shown). The autopilot 120 is also connected to a standard 2.4 GHz R/C receiver 210. The separate connections allow either the 900 MHz wireless 200, or the standard 2.4 GHz R/C transmitter/receiver 210 to send separate instructions to the autopilot 120 to override the autonomous mode of operation so that manual vehicle control may be effected.

The autopilot 120 may include standard processing and memory capability, including a central processing unit (CPU), RAM, wireless communication interfaces, and/or other components. The autopilot 120 may include, or be modified to include, software that may operate to provide various functionality, such as data gathering, plan form area modification and energy optimization. The autopilot 120 control software may be implemented as an application run on existing computer operating systems. The autopilot 120 application may be ported to other personal computer (PC) software, and/or any other digital device with appropriate storage capability.

The processor of the autopilot 120 may access memory storage in which may be stored at least one sequence of code instructions that may include the software program for performing predetermined operations such as autonomous flight missions with energy optimization protocols. While the system of the present invention may be described as performing certain functions, one of ordinary skill in the art will readily understand that the software program may perform the function rather than a component of the system itself. The memory may be a storage device that stores at least one data file, such as image files, text files, audio files, video files, among other file types.

Referring to FIGS. 8-9 camera assembly support plate 92 is a round structure that provides support for any camera assembly, but in this embodiment includes the following components: pan servo motor 94, tilt servo motor 96, roll servo motor 98, transmitter/receiver assembly 100 and camera 36, and the linkages between the servos and their driven components. Camera assembly support plate 92 is connected to the chassis at a central position via an axel that allows for relative rotational movement about the central axis of the aircraft. The axle is of any conventional design. Other embodiments that connect the chassis and camera support assembly, yet allow for relative rotation, come within the spirit and scope of the invention, such as circular ball-bearing assemblies, sliding tracks, etc. Camera assembly support plate 92 is held slightly away from the bottom of chassis 110 at three contact points; two idler wheels 106 and pan wheel 104. Pan wheel 104 is driven by pan servo motor 94, at the direction of the autopilot, and/or the ground station. When pan wheel 104 is actuated, since the wheel is in direct contact with the bottom of the chassis, as the pan wheel 104 turns, it translates its rotational motion to the camera assembly support plate 92 by its friction-based engagement, thereby rotating the entire camera assembly in the horizontal plane. Tilt servo motor 96 (FIG. 12) is mounted on tilt servo bracket 97 (not shown) and is directly coupled to camera 36. In an alternate embodiment the tilt servo motor may be directly connected to camera assembly support plate 92. Similarly situated but on the opposite side, roll servo motor 98 is mounted to support plate 92 through roll servo bracket 99, and roll servo 98 is directly coupled to the camera. These three servos thereby allow for 3-axis control of the camera.

Figure 11:
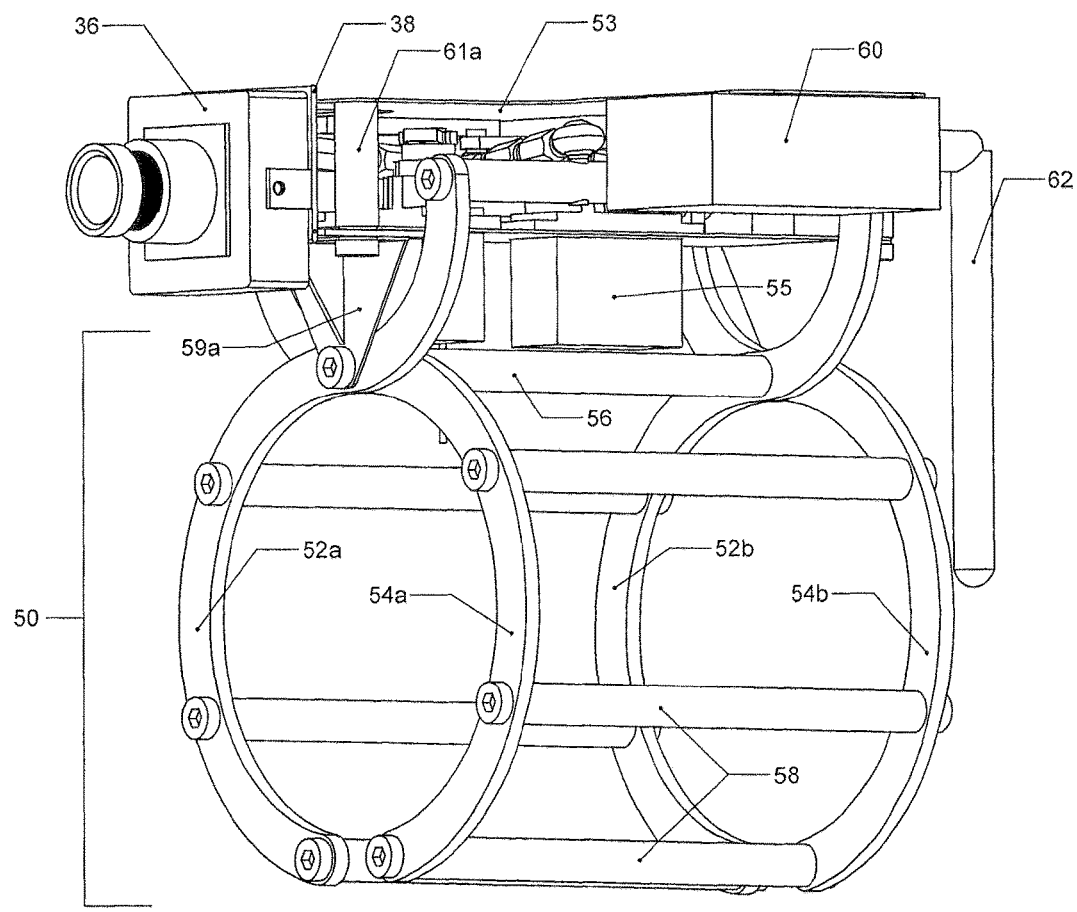
FIG. 11 is a computer-aided depiction of the camera/gripper assembly 34 from the video transmitter 60 side but rotated approximately 45 degrees toward the viewer.
Figure 12:
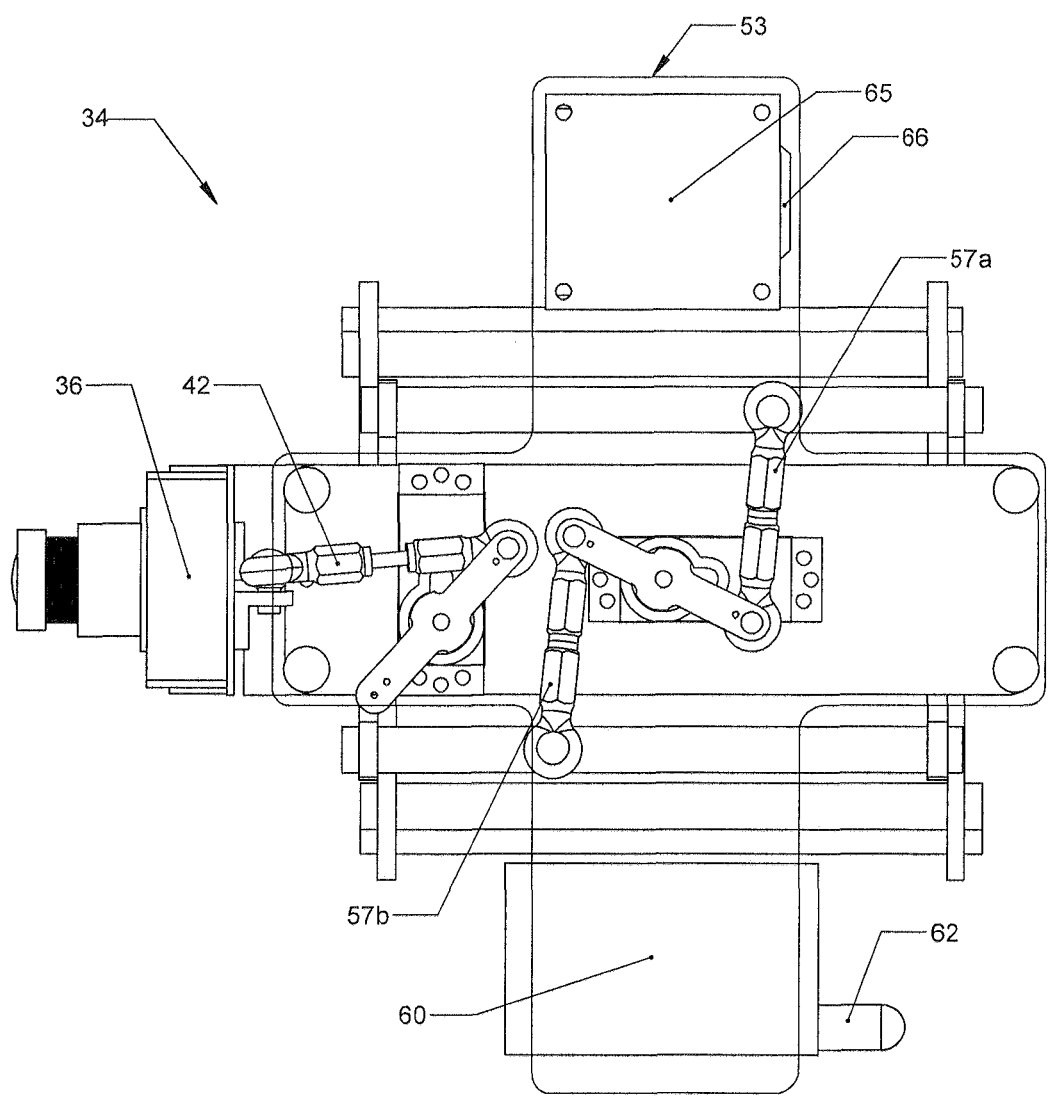
FIG. 12 is a computer-aided depiction of the camera/gripper assembly 34 from the top with the gripper plate 53 rendered mostly transparent.

FIG. 10-12 are computer-aided depictions of the camera/gripper assembly 34. FIG. 110 is a computer-aided depiction of the camera/gripper assembly 34 from the video transmitter 60 side. Camera 36 is shown in its articulating camera mount 38. Mount 38 is connected to the gripper lower platform 51 via camera mount hinge 40 and L-bracket 39. The other end of the L-bracket is connected in a swiveling manner to the servo arm/linkage 42. When camera tilt servo motor 44 is actuated in the forward direction it pushes the top, back portion of the camera mount downwards and so affects a tilt function.

Gripper assembly 50 comprises two pairs of C-shaped gripper arms left and right, 52*a, b* and 54*a, b*, respectively, as shown in FIG. 10-11, which operate in scissors fashion to open and close thereby engaging an object such as a round cylindrical package. The gripper arms are held apart and parallel to each other using the spacers and internal nut-and-bolt combinations shown as gripper arm spacers 58. Gripper pivot rod 56 establishes the pivot point for the gripper arms and also functions to hold the arms parallel to each other. The gripper arms are actuated through gripper servo motor 55 in FIG. 10-11 and gripper servo arm/linkages 57*a, b* in FIG. 12. Gripper platform L-brackets 59*a,b* tie the gripper lower platform 51 at both ends through gripper pivot rod 56 and gripper platform standoffs 61*a-d* to the gripper arms.

Electronics packages may be included on the gripper/camera assembly, as shown here. For convenience sake the electronic packages are shown attached to the gripper lower platform 51, although they could also be attached to the gripper plate 53. For example, in one embodiment a video transmitter 60 is connected to the camera 36 and transmits video data via video antenna 62 to the ground station. Similarly, a radio frequency communication link 65 may communicate to the ground station via RF antenna 66. Links may include a wireless video link such as an analog, digital or Wi-Fi video transmission/receiver (for example, a 900 MHz-5 GHz analog or digital transmission, or Wi-Fi device), that sends video and still photo signals wirelessly to the video recorder at the remote ground station. The total number of electronics packages that may be carried by the gripper/camera assembly is limited only by the available space and weight considerations.

In embodiments of the invention the aircraft uses a variety of sensors that feed information to the on-board autopilot. The first is a sonar ground sensor 134 (not shown) for determining when the aircraft is within 0-10 meters of the ground. Another altitude-measuring sensor is a barometric pressure transducer 136 (not shown) for altitude and rate of ascent/descent information. A Global Positioning Satellite (GPS) system 138 provides three-dimensional information for location of the aircraft, and also velocity. A 3-axis gyro/accelerometer 140 provides positional data with respect to the horizon, that is, it provides roll/pitch/yaw data to the autopilot 120. A magnetometer 142 provides magnetic compass headings to the autopilot 120. An optical flow detector 144 (not shown) provides obstacle information, and a Transponder (Mode C) 146 (not shown) may be used for identification to regulatory authorities such as FAA or military. Optional sensors include acoustic sensors 148 (not shown) for gunshot detection and location, and repeater transmitters 149 (not shown) for extending communications. Other accessories include various cameras including night vision capability and other gripper devices for delivering and/or picking up objects. Combinations of these accessories may also be made, such as shown in FIG. 10-12 wherein a camera has been combined with a gripper. Other sensor packages are well-known and come within the spirit and scope of the invention.

FIG. 13A-D is a logic flowchart documenting the decision-making algorithms involved in operating the aircraft in a first embodiment. The description that follows represents but one possible operational mode of the aircraft, and one of ordinary skill in the art will understand that numerous variations from these may occur in practice. However, the following is an overview of a typical operational protocol.

The unmanned aircraft is a system that comprises two separate physical units, the aircraft itself and its base station plus hand-held remote. In this embodiment it is assumed that the base station is powered on and the software is booted up. The base station may be any common ground-based PC, laptop PC, iPad, hand-held smart phone or similar portable computing device equipped with the communications software and hardware necessary for remote-control operation via FCC-approved and FAA recognized RF transmitter/receiver systems. The hand-held remote control unit includes antenna for receipt of the video transmission broadcast by the aircraft 5, and an associated plug which connects to the display screen on the hand-held remote control unit. In one embodiment the screen is a flat panel LCD of any commercially available size. In one embodiment, the unit may also include dual video inputs and picture-in-picture video capability for monitoring of multiple video inputs from a plurality of remote aircraft.

In an exemplary embodiment, there is a standard operation remote control assembly with circuits and boards on the back side of the hand-held remote control unit, which would be familiar to one of ordinary skill in the art. The remote control (R/C) assembly includes joy sticks (for example, 2.4 GHz R/C joysticks with programmable settings and sensitivities) disposed on the front side of the hand-held remote control unit, on either side of the screen, for operation of the aircraft 5 and the payload, such as a camera-gripper assembly 34. The R/C mode allows the user to utilize the wireless R/C controls to remotely rotate the camera 360 degrees and pan/tilt 0-90 degrees via the 2.4 GHz link. A typical high-end 10-channel DSM R/C controller is a Spektrurn DX-10, 2.4 GHz, available from Horizon Hobby, U.S. Ltd. This arrangement also allows, via a wireless 900MHz-5 GHz transmitter on the aircraft, transmission to the ground station live active video.

Figure 13A:
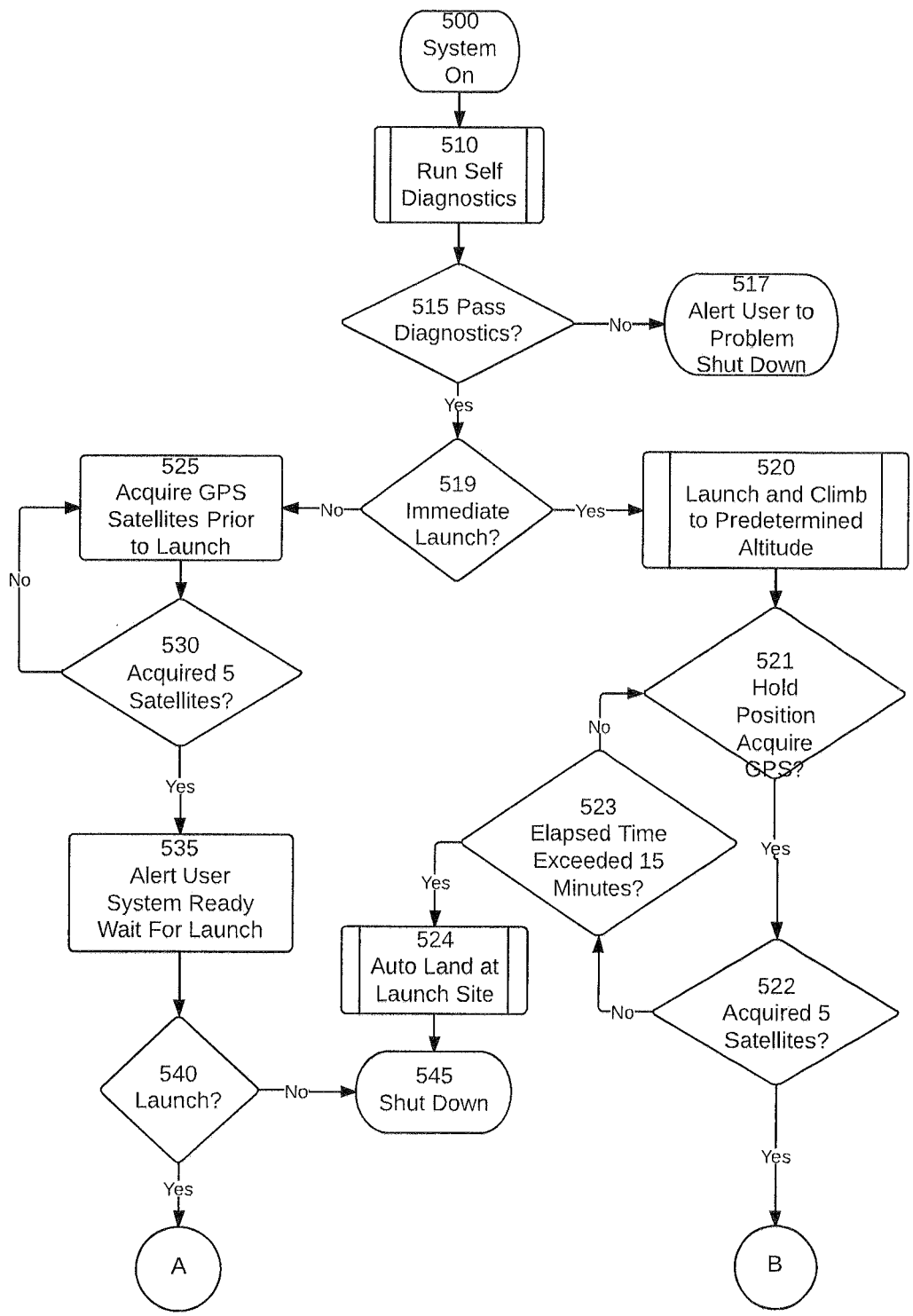
FIG. 13A-D is a logic flowchart documenting a typical mission flight algorithm for operating the aircraft in one embodiment.
Figure 13B:
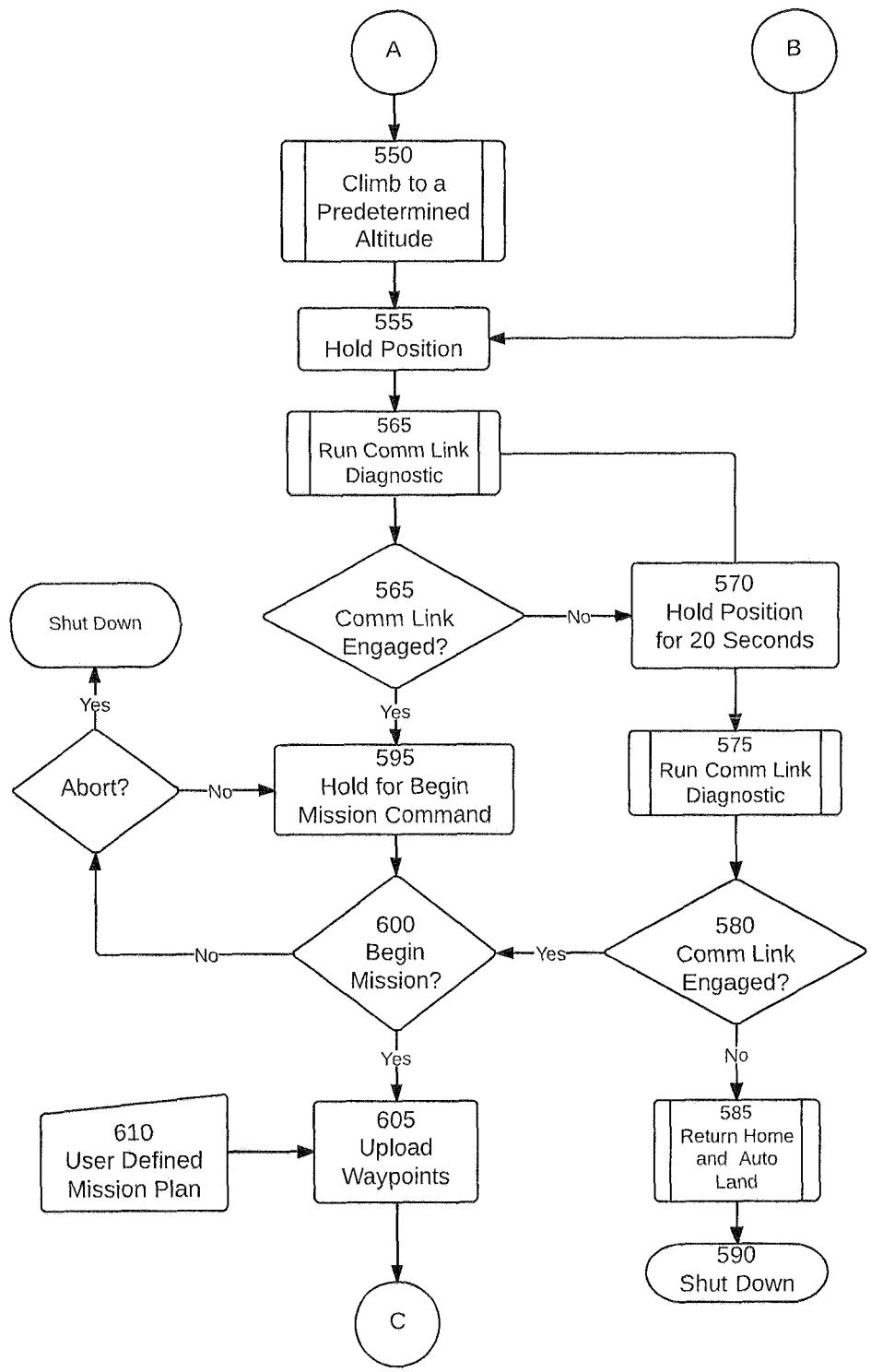

FIG. 13A shows the aircraft starting sequence, beginning with step 500, which is the "System On" step. When the aircraft is powered on, it then runs a system diagnostic shown at task 510. The diagnostic tests typically run include polling the various electronic components to ensure they are on-line, and that their individual statuses are operational 515. If there is a failure at this step then the user is alerted and the aircraft is shut down at end point 517. If the diagnostic passes then the next step is to determine the launch/acquire GPS sequence 519. If there is adequate time and the local GPS signal on the ground is strong, the instruction to detect GPS signals from local satellites (step 525) may be given. If signals are weak and/or a rapid launch is desired, the aircraft may be launched before GPS is acquired 520. It is acceptable that the signals from at least four satellites are acquired prior to actual usage; it is preferred that five satellite signals are acquired (step 530). Once GPS is acquired, the system alerts the user via the established communications link that the aircraft is ready for launch (step 535) and a launch waiting mode 540 is entered. After a predetermined amount of time with no launch signal the aircraft will shut down 545 so as to conserve battery power and await further commands. Once the aircraft has successfully acquired GPS and has been launched, it will climb to a pre-set altitude 550.

The aircraft may be commanded to launch by the user 519 under certain operational scenarios prior to detecting GPS and climb to a predetermined altitude 520 and then hover at that location 521 while acquiring GPS signals from local satellites 522. If unable to acquire GPS in a reasonable time 523 in this scenario the aircraft will autoland 524 and shut down 545.

Once at altitude, having acquired GPS, and holding position 555, the aircraft will run another self-diagnostic program 560 to ensure the communications link to the base station is properly engaged and that all components are operational. If the diagnostics indicate the aircraft is fully operational, the aircraft is instructed to wait until a "Begin Mission" command 595 is received from the user. If the diagnostic were to indicate a faulty communications link, then the aircraft will wait for twenty or so seconds 570, re-run the communication link diagnostic 575, and if the link is then established it will hold the aircraft in position for the "Begin Mission" command 595, or if not the aircraft will return home and autoland 585 and shut down 590. Given the aircraft receives the "Begin Mission" command 600 and is in communication with the base station, it begins to upload the entire protocol including waypoints 605 for the mission from 610 and downloads data to the control station including real time GPS coordinates, speed and direction information and other data. In an alternate embodiment, the mission protocol is uploaded prior to takeoff either wirelessly from the ground station, or via a USB or other wired connection.

Figure 13C:
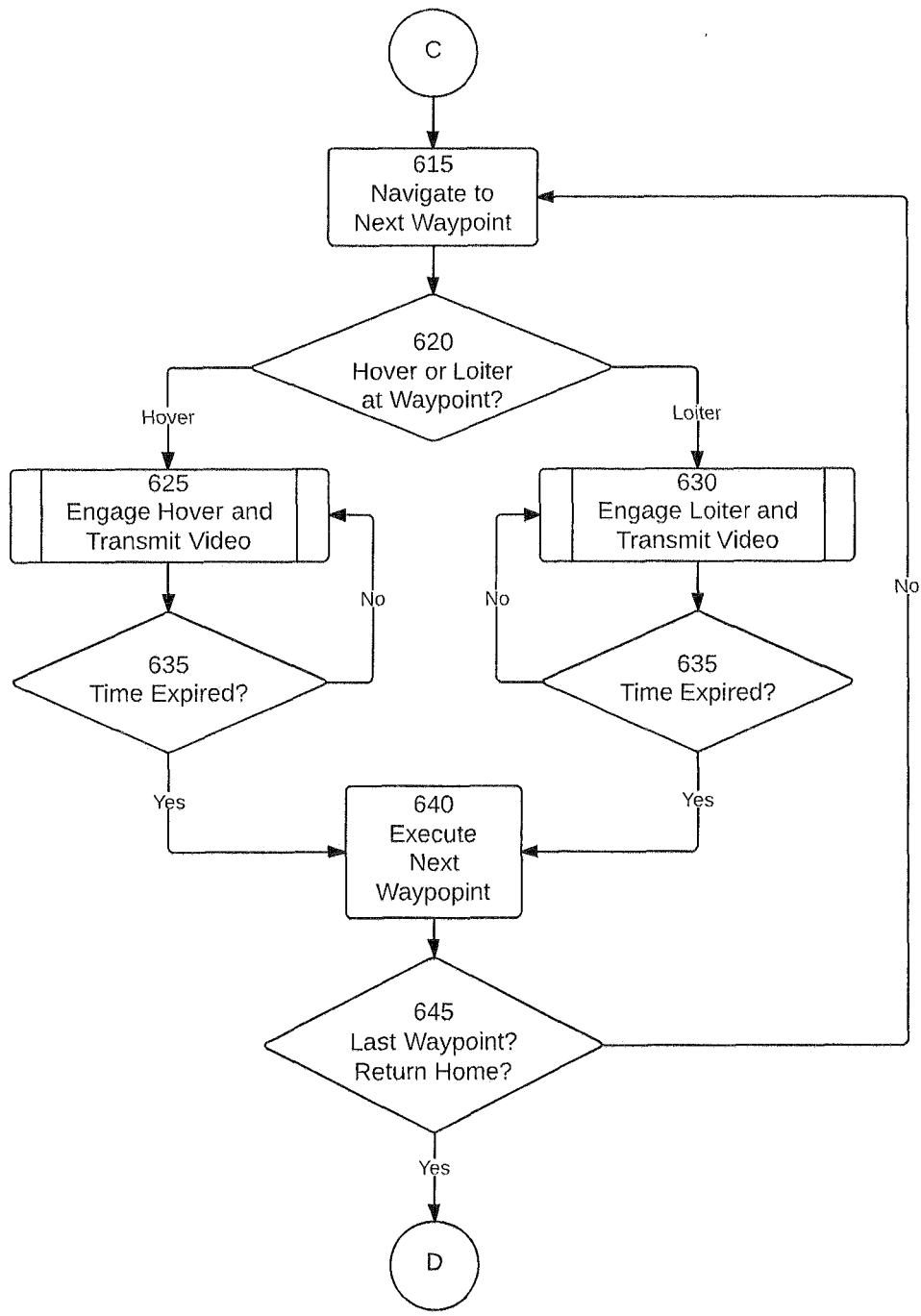

FIG. 13C continues the logic diagram with step 615 which is to proceed to the first waypoint. The autopilot calculates the flight plan from the current location to the first waypoint's GPS coordinates and executes the flight path to get there. When the aircraft arrives it then determines from the mission protocol whether to engage a loitering flight path 630 at this waypoint 620, to merely hover over the point of interest 625, or to immediately proceed to the next waypoint. Hovering and loiter routines afford maximum benefit (i.e., extended mission flight time) from the invention's energy harvesting and power management capability. In either event, after a predetermined time at this location, time will expire 635 and the mission protocol will execute instructions to get the aircraft to the next waypoint 640. If the next waypoint is Home, then the aircraft will begin to navigate home and prepare for its auto landing routine; if not then the aircraft proceeds according to protocol to the next waypoint 615.

Figure 13D:
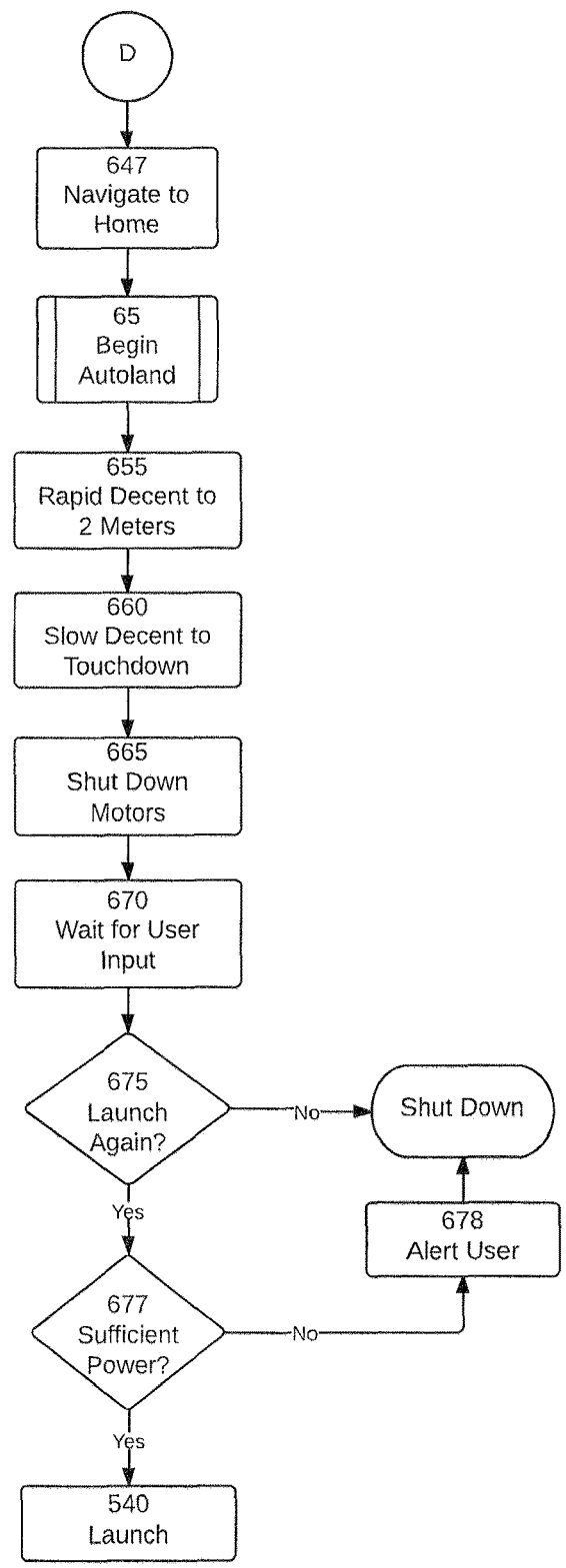

FIG. 13D outlines the logic flow for the automated landing routine 650, which in one embodiment comprises a rapid descent to about two meters above ground 655, then a slower descent from about 2 meters to touchdown 660. The aircraft then shuts down its motors 665 and waits for another user input 670. If the input is to launch again 675, a determination of the remaining battery power is made, and if insufficient to perform the next mission, a rapid battery change out is made and the protocol resumes at 540; if there is no further command after a preset time then the system shuts down automatically 680.

Figure 14:
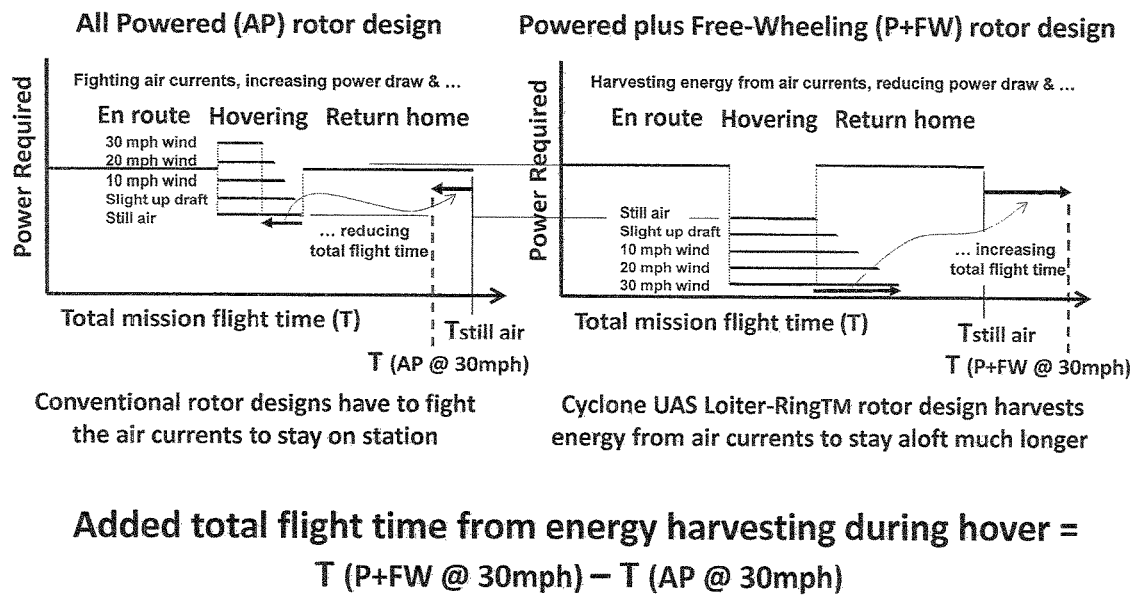
FIG. 14 is a graphical comparison of total flight times for an all powered rotor aircraft with the same aircraft having said energy harvesting capability, both operating in "hover" mode, for the same simple fly out, hover and fly back mission.

FIG. 14 is a graphical comparison of two versions/designs of the current multi-rotor invention, both operating in "hover" mode. Both graphs measure the power required to perform a typical mission (Y ordinate) versus total mission flight-time (X ordinate). The left graph depicts the operational parameters for the all-powered-blade-design (no freewheeling rotors nor energy harvesting flight software), and the right graph depicts the powered-plus-free-wheeling-blade-design with said energy harvesting and power management flight software. In both graphs five different air current conditions are represented: Still air, slight up draft, and 10-, 20- and 30-mph wind conditions. In the left graph representing the all-powered-blade-design scenario it is apparent that a lesser amount of power is used to hover in still air versus in wind because the aircraft only needs to support its full weight, and not fight to maintain position. If the aircraft also has to fight air currents to maintain position, it will have to expend additional power to remain on station. In the latter scenario fighting air currents will result in a net decrease in the amount of mission time available.

In the right graph the same scenario is presented except that a subset of rotors is operating in free-wheeling mode only so that they can vary the plan form area of the aircraft. In one embodiment four out of eight rotors are allowed to be free-wheeling. "Kiting" allows the free-wheeling rotors to spin and provide drag against air currents (updrafts, wind, etc.), thereby creating a larger plan form area of the aircraft against which the air currents will exert upward force. In addition, when the energy harvesting and power management program increases the relative angle of attack of the aircraft into the wind, this creates additional lift resulting in yet further decreases in the amount of power needed to hover. Increases in updraft to an extent, decrease the power required to hover. In this mode, the additional lift that is created by updrafts increase the available mission time due to the decreased power required to hover.

Figure 15A:
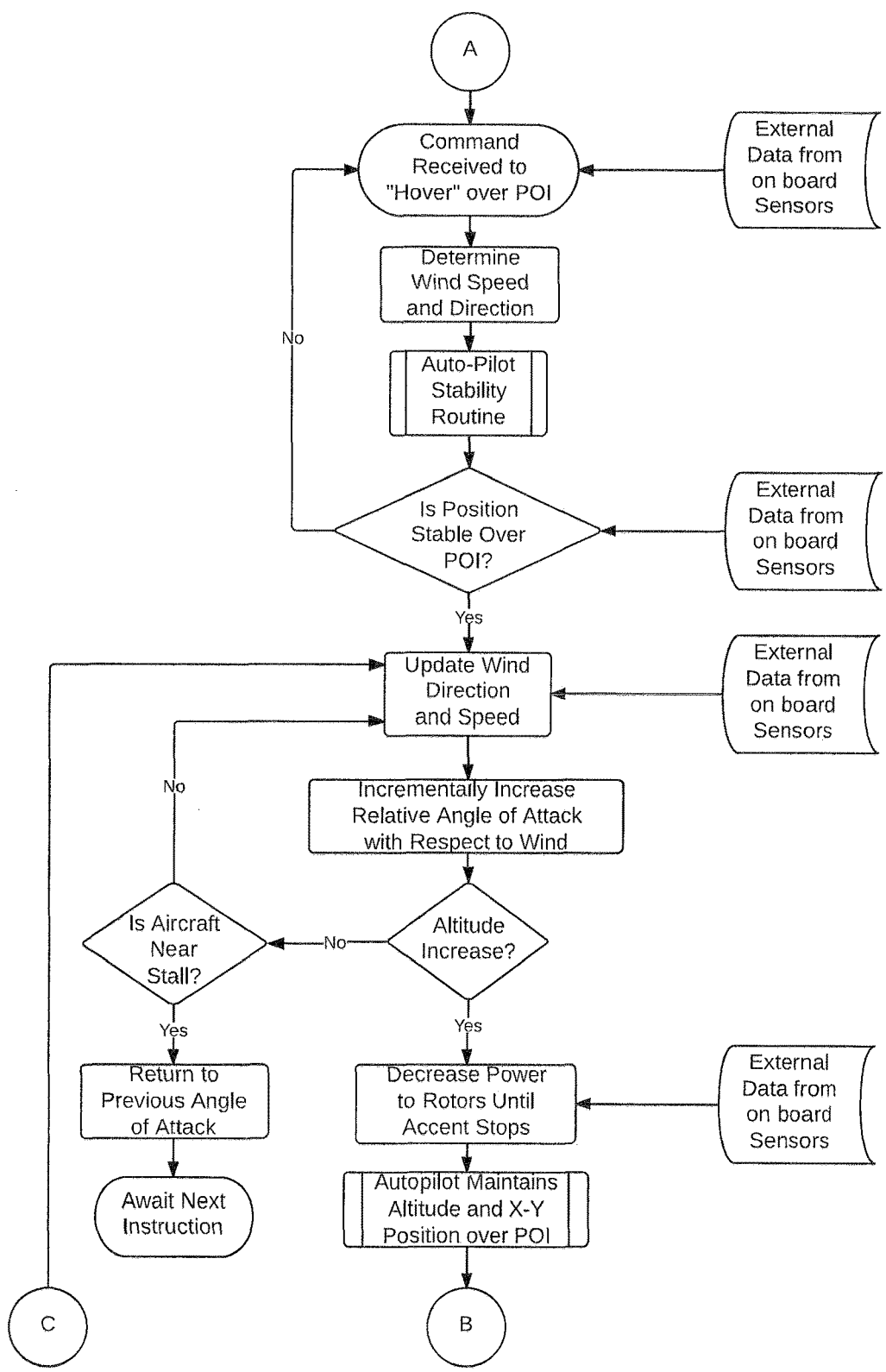
FIG. 15A-B is a logic/decision flow chart of the LOITER-RING™ energy harvesting flight algorithm.
Figure 15B:
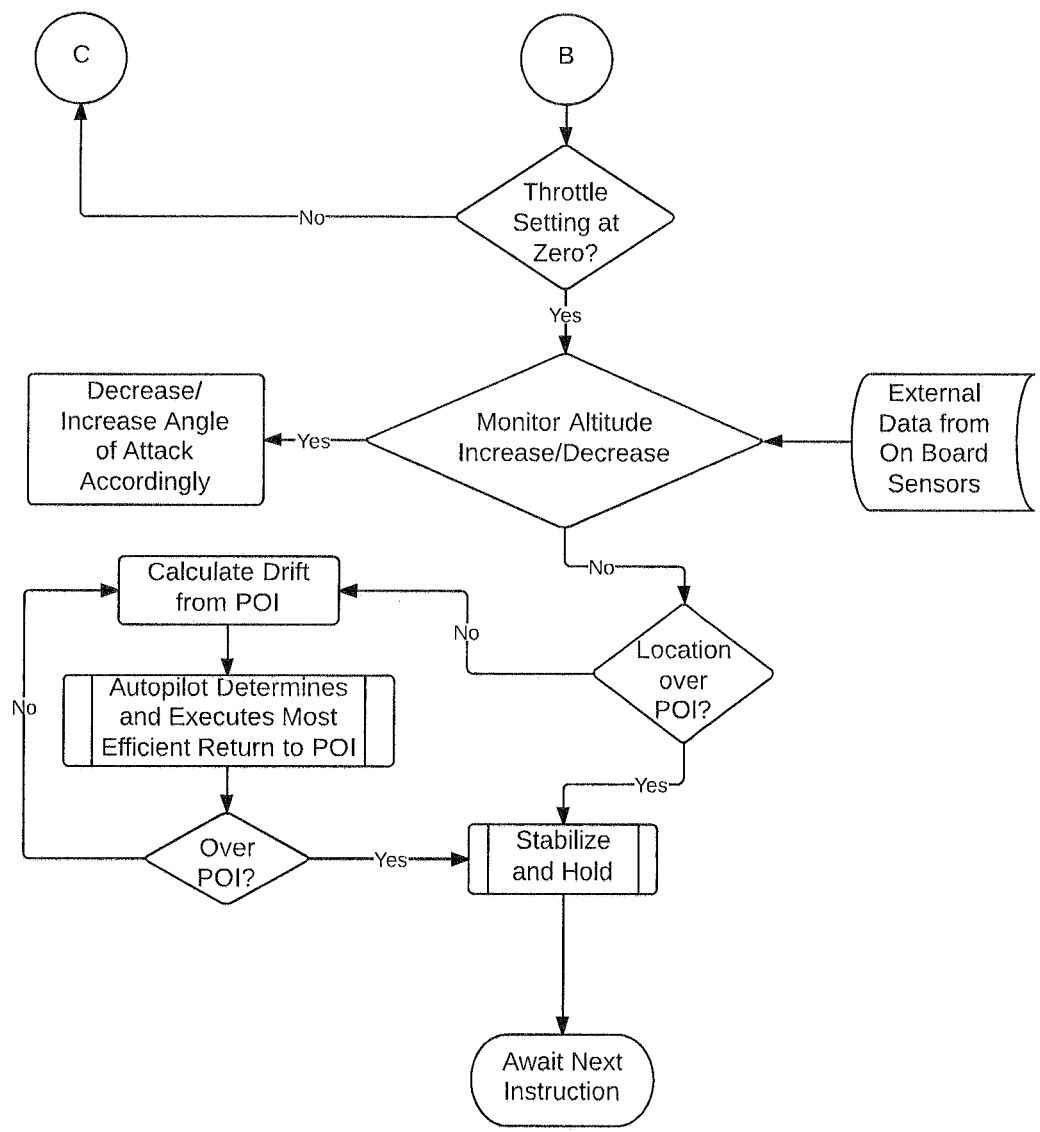

In another embodiment the software comprising the plan surface area optimization and energy generation optimization functions for minimizing power consumption and generating energy from one or more of the unpowered rotors while hovering, loitering, and in-flight is depicted in the logic diagram of FIG. 15A-B. These two figures when taken together form a single logic diagram of the Loiter-Ring™ concept for a hovering scenario. Similar but typically lesser reductions in the power draw from the battery will occur for loitering scenarios and lesser yet for in flight scenarios. With direction to FIG. 15A, once the aircraft reaches a point of interest (POI) where it is commanded to hover over that point the existing Stability Routine, a function of the autopilot, will adjust the aircraft's attitude so that it will park itself over a predetermined GPS point, automatically correcting any drift resulting from air currents. The Loiter-Ring™ energy harvesting and power management routine is then initiated by the autopilot. The autopilot continuously polls its various on board sensors to determine its position and the speed and direction of the wind. The autopilot's Stability Routine maintains its position over the point of interest. In one embodiment the Stability Routine will have parameters that are set either tightly or loosely. Loose parameters will set the three-dimensional "box" in which the aircraft must maintain itself as large, e.g., a 5 m×5 m×5 m box. In other embodiments the dimensions of the box may be smaller, say 1 m×1 m×1 m. The aircraft's stability within such a predetermined box will depend in part on the speed and variability of the wind and direction. However, since the on-board cameras are servo-controlled they have the ability to maintain a relatively stable picture of the point of interest or object notwithstanding the relative movements of the to aircraft.

If the Stability Routine is successful, then the autopilot will determine the wind direction and speed (i.e., its velocity). Next, the Loiter-Ring™ program will start to incrementally increase the relative angle of attack with respect to the wind's direction by a modest amount, in one embodiment by one degree at a time, while monitoring its altitude (and X-.Y position compared to the POI) to determine if the aircraft is rising. The angle of attack may be increased by increasing the speed of a forward rotor and simultaneously decreasing the speed of a directly opposite and rearward rotor, thereby tilting the aircraft on its axis relative to the wind. The autopilot will then work towards sustaining the aircraft's original vertical position by reducing the speed of the powered rotors to reduce total lift while also working to maintain its X-Y position over the POI. In another embodiment having free-wheeling rotors or rotors on micro-generators, mounted on articulating knuckles, the tilt of the rotors may also be adjusted to change angle of attack.

Changing the relative angle of attack of the aircraft to the wind has the effect of increasing the effective plan form area of the aircraft because the unpowered rotors will begin to free-wheel, thereby increasing drag/lift. Also, the increase of the relative angle of attack to the wind will have the effect of increasing lift on the powered rotors. In combination the two effects will tend to increase the altitude of the aircraft unless power is simultaneously decreased to the powered rotors.

If the aircraft is rising (positive rate of climb), then the Loiter-Ring™ program will decrease power to the rotors until the rise stops or the rate of climb is decreased to a new, desired rate. In this way the new angle of attack and position over the point of interest can be maintained by the powered rotors while the free-wheeling rotors are allowed to contribute lift to the aircraft, decreasing the power draw from the battery. The powered rotors may draw some incremental added power from the batteries to counteract drift and maintain the required X-Y position over the POI.

The angle of attack parameters are governed by the "stall" characteristics of an airfoil. In the case of free-wheeling rotors the aircraft acts in part as a flat airfoil similar to a kite. There is a relative angle of attack for the aircraft with respect to the wind speed at which the airflow over the airfoil will separate from the laminar flow and turbulate causing the airfoil to "stall" and stop generating lift. Similarly, there is a minimum angle at which lift will be minimized. The Loiter-Ring™ program will calculate these maximum and minimum angles of attack continuously and prevent the aircraft from going beyond those two parameters.

FIG. 15B is the continuation of FIG. 15A and begins with the "Throttle setting at zero" query. If the program determines that the throttle is at zero, then power consumption can no longer be minimized via the Loiter-Ring™ program. In this state the aircraft will carefully monitor its position over the point of interest, both its altitude and X-Y coordinates (i.e., its GPS coordinates). If the altitude increases or decreases, then the angle of attack may be changed (decreased or increased respectively). If the location (X-Y position) over the point of interest has changed, then the autopilot must calculate the drift and reposition the aircraft over the POI. The autopilot will again stabilize the aircraft over the point of interest. If the wind conditions change, the program will re-enter the Loiter-Ring™ routine by rechecking the throttle setting.

Autonomous Method of Operation

Another embodiment of the invention is directed to an autonomous or automated method of operating a multi-rotor aircraft at least partially powered by battery, having a plurality of powered and unpowered rotors, data and power buses, and sensors comprising a wind speed and wind direction sensor, an altimeter and a magnetometer; providing an on-board autopilot adapted to be in electronic communication with the airframe through which the autopilot is connected to the sensors, the autopilot being programmed to execute the following actions: flying/loitering/hovering the aircraft by applying power to at least one powered rotor; determining or directly measuring relative wind speed arid wind direction at the aircraft and determining whether the wind speed is at or greater than a predetermined minimum wind speed; orienting the aircraft substantially into the wind; increasing the relative angle of attack of the aircraft incrementally until a positive rate of climb is detected; decreasing power to the at least one powered rotor until the rate of climb is adjusted to a desired new rate of climb; and repeating the steps of increasing the angle of attack and decreasing power to at least one powered rotor until no further positive rate of climb is detected, or the stall limit is reached.

The above method can be executed by any multi-rotor aircraft, typically a multi-rotor aircraft that has at least two rotors, one powered and one unpowered. The unpowered rotor is needed for free-wheeling, and in a separate embodiment at least one rotor is unpowered and free-wheeling and is connected to a micro-generator. In this embodiment the unpowered rotor/micro-generator combination spin due to the air currents and the electrical current generated is directed to a battery controller for either recharging the batteries or powering the aircraft, as previously outlined. In at least several separate embodiments, the method may utilize sets of 4, 6 or 8 rotors. In an exemplary embodiment, six rotors are illustrated herein, although eight or even more may be utilized. The larger the number of rotors the larger the lift capacity, and the larger the plan form area may be. One of ordinary skill will independently determine the number and type of rotors depending on the desired lift capacity.

The rotors may be made from any conventional materials although strong, lightweight thermoplastics or carbon fiber composites are strongly preferred due to their advantageous strength-to-weight ratios. The pitch of the rotors may be fixed or variable. A fixed pitch for the unpowered rotors of 1-3 degrees less than the powered rotors is desirable as that increases the drag and increases lift, as previously outlined, which modifies the plan surface area of the aircraft. Modification of the aircraft's plan surface area by manipulating the plan surface area of the aircraft is one of the main insights of the invention. That is, the aircraft may have an essentially adjustable plan surface area that is modifiable by changing either the relative angle of attack of the aircraft into the wind, changing the pitch of the unpowered rotors, or a combination of both. Changing the relative angle of attack has been discussed previously. Changing the pitch of the rotor blades is well-known to one of ordinary skill in the art, and may be accomplished using swash plates to collectively raise and lower pitch.

Ideally, the wind speed is at or greater than a predetermined minimum wind speed. The minimum wind speed will depend upon the ratio of plan surface area to weight. Below the minimum the program will instruct the aircraft to remain in powered-only flight.

In another embodiment the method requires orienting the aircraft substantially into the wind. However, since the multi-rotor aircraft is symmetrical and there may be no apparent front or rear per se, the determination is made by the autopilot as to which aspect of the aircraft is by default considered the front. The front could be shifted from point to point around the aircraft, so long as at any one time the autopilot has defined which part is to be considered the front for purposes of orienting the aircraft into the wind. In a further embodiment the angle of attack into the wind is adjusted by the autopilot until either the aircraft rises, or it approaches its stall limit. The stall limit is well-known as the angle of attack of an airfoil at which lift begins to decrease. Therefore, the autopilot is limited from increasing the angle of attack above the stall limit because of the loss of lift and/or control of the aircraft that would result.

In a further embodiment if GPS is not available a more basic or advanced Inertial Guidance System (IGS) may be utilized to provide the autopilot real time information regarding aircraft direction, speed, and altitude. Therefore an IGS in combination with wind direction and speed information are all that are needed to engage the Loiter-Ring™ software.

In yet another embodiment the method includes at least one unpowered rotor adapted to be in electrical communication with the autopilot, the method additionally comprising the step of braking (slowing) the unpowered rotor when the autopilot's software determines a decrease in drag is desired. In one embodiment braking the unpowered rotor may be effected if the rotor is connected to a micro-generator to which a reverse current could be applied, thereby slowing the rotor. If the rotor is slowed then the virtual disk is decreased in area, per the earlier discussion above, and more air will flow through the disk unimpeded, and drag will be reduced. Other means of braking the rotor may also come within the ordinary skill in the art.

The aircraft may be used in combination with other identical or similar robotic aircraft to form a squadron of robotic autonomous aircraft that may be controlled from a single ground station to carry out coordinated missions. Given that the protocol may include a plurality of robotic aircraft, it is seen that in one embodiment a pair of aircraft could be used to monitor a ground situation from more than one angle, or more than one altitude. In addition, since acoustic gunshot monitoring requires two to three points, a virtual acoustic gunshot detection platform could be instantly deployed on the ground. Methods and apparatus for detecting and locating gunshots using acoustic signal processing are well-known, and are exemplified in U.S. Pat. Nos. 7,266,045, 7,796,470 and 7,474,589 which are incorporated herein in their entirety.

It will be understood that various modifications may be made to the embodiments disclosed herein. Therefore, the above description should not be construed as limiting, but merely as exemplifications of preferred embodiments. Those skilled in the art will envision other modifications that come within the scope and spirit of the claims appended hereto. All patents and references cited herein are explicitly incorporated by reference in their entirety.

| Part Numbers | |
|---|---|
| 5 | Multi-rotor aircraft |
| 10 | Upper dome |
| 12 | Arm |
| 14 | Motor |
| 15 | Micro-generator |
| 16 | Rotor |
| 18 | Machine screw |
| 19 | Landing leg |
| 20a-c | Motor control wires (to ESC) |
| 22 | Pivot assembly |
| 23 | Pivot block |
| 24 | Pivot retainer |
| 26 | Block pivot rod |
| 30 | Lower dome |
| 31 | Upper dome cutouts |
| 32 | Sensor plate |
| 33 | Dome anchors |
| 34 | Camera-gripper assembly |
| 36 | Camera |
| 38 | Articulating camera mount |
| 39 | L-bracket |
| 40 | C mount hinge |
| 42 | Servo arm/linkage |
| 44 | Servo motor (camera tilt) |
| 46 | Servo motor base plate |
| 50 | Gripper subassembly |
| 51 | Gripper lower platform |
| 52a,b | Gripper arm left |
| 53 | Gripper plate |
| 54a,b | Gripper arm right |
| 55 | Gripper servo motor |
| 56 | Gripper pivot rod |
| 57a,b | Gripper servo arm/linkages |
| 58 | Gripper arm spacers |
| 59a,b | Gripper platform L-brackets |
| 60 | 5.1 GHz Video transmitter |
| 61a-d | Gripper platform standoffs |
| 62 | Video transmitter antenna |
| 65 | RF communication link |
| 66 | RF antenna |
| 70 | Storage tube assembly |
| 72 | Top cap |
| 74 | Bottom cap |
| 76 | Foam cradle |
| 78 | Motor support ring |
| 80 | Storage tube |
| 90 | 3-axis camera platform assembly |
| 92 | Camera assembly support plate |
| 94 | Pan servo motor |
| 96 | Tilt servo motor |
| 97 | Tilt servo bracket |
| 98 | Roll servo motor |
| 99 | Roll servo bracket |
| 100 | Transmitter/receiver assembly |
| 104 | Pan wheel |
| 106 | Idler wheels |
| 110 | Chassis |
| 112 | Lower retainer plates |
| 114 | Upper retainer plate |
| 116 | Electronic Speed Control (ESC) |
| 118 | Inertial Measurement Unit (IMU) |
| 120 | Autopilot assembly |
| 121 | SMD card |
| 122 | Standoffs |
| 130 | Accessory support plates |
| 134 | Sonar ground sensor |
| 136 | Barometric Pressure transducer |
| 138 | GPS system electronics |
| 139 | GPS Antenna |
| 140 | Gyro/accelerometer (3-axis chip) |
| 142 | Magnetometer (magnetic compass) |
| 144 | Optical flow detector |
| 146 | Transponder (Mode C) |
| 148 | Acoustic sensor |
| 149 | Repeater transmitter |
| 150 | Articulating knuckle |
| 160 | Power distribution and voltage regulation bus |
| 170 | Data bus |
| 180 | Battery charging system |
| 182 | Battery pack |
| 184 | Balancer/charger |
| 185 | Battery controller |
| 200 | 900 MHz wireless transceiver |
| 210 | 2.4 GHz RF transceiver |

We claim:

1. A battery optimization system for a rotary-wing aircraft comprising:
   a. a battery-powered airframe having a plurality of powered and unpowered rotors, data and power buses, and sensors selected from the group consisting of a wind speed/direction sensor, an altimeter and a magnetometer;
   b. an on-board GNC system in electronic communication with said data and power buses through which said autopilot is connected to said sensors, said autopilot also being in electronic communication with said powered and unpowered rotors;
   c. one or more batteries in electrical communication with said system;
   d. electric motors connected to and for driving each powered rotor, said electric motors being in electrical communication with said system;
   e. a micro-generator connected to each unpowered rotor, said micro-generator being in electrical communication with said system;
   f. a battery controller for, when in hover, loiter, or in-flight mode, directing power from said micro-generators to either one or more batteries thereby recharging it/them, or directing power to said power bus thereby powering said aircraft electronics whereby battery drain is minimized.

2. The system of claim 1 wherein said sensors further comprise a GPS system and a 3-axis gyroscope/accelerometer.

3. The system of claim 1 wherein said electric motor is a direct current brushless motor.

4. The system of claim 3 wherein each brushless DC motor is in electrical communication with an ESC.

5. The system of claim 1 wherein said autopilot comprises software that receives data from a wind speed sensor and if the wind speed exceeds a pre-set value, the autopilot orients the aircraft substantially upwards and into the wind.

6. The system of claim 1 wherein said autopilot comprises software that allows at least one unpowered rotor connected to a micro-generator to freewheel and subsequently signals said battery controller to direct the current generated to either recharge at least one of the batteries or to power the aircraft electronics.

7. The system of claim 6 wherein said battery controller comprises software that will direct current to power the aircraft electronics operations if all batteries are fully charged.

8. The system of claim 6 wherein the battery controller comprises software that will compare battery charge levels and direct current to the battery with the lowest charge.

9. The system of claim 1 wherein said electric motors or micro-generators are connected to an articulating knuckle that is connected to the aircraft.

* * * * *